United States Patent
Uludag

(10) Patent No.: US 11,551,387 B2
(45) Date of Patent: Jan. 10, 2023

(54) SYSTEMS AND METHODS FOR HAIR RASTERIZATION

(71) Applicant: Electronic Arts Inc., Redwood City, CA (US)

(72) Inventor: Yasin Uludag, Stockholm (SE)

(73) Assignee: Electronic Arts Inc., Redwood City, CA (US)

(*) Notice: Subject to any disclaimer, the term of this patent is extended or adjusted under 35 U.S.C. 154(b) by 0 days.

(21) Appl. No.: 17/471,509

(22) Filed: Sep. 10, 2021

(65) Prior Publication Data

US 2022/0084226 A1   Mar. 17, 2022

Related U.S. Application Data

(60) Provisional application No. 63/078,959, filed on Sep. 16, 2020.

(51) Int. Cl.
| | | |
|---|---|---|
| *G06T 11/40* | (2006.01) | |
| *G06T 15/80* | (2011.01) | |
| *G06T 15/40* | (2011.01) | |
| *G06T 7/507* | (2017.01) | |
| *G06T 7/90* | (2017.01) | |
| *G06T 7/70* | (2017.01) | |

(52) U.S. Cl.
CPC .............. *G06T 11/40* (2013.01); *G06T 15/40* (2013.01); *G06T 15/80* (2013.01); *G06T 7/507* (2017.01); *G06T 7/70* (2017.01); *G06T 7/90* (2017.01)

(58) Field of Classification Search
CPC ....... G06T 11/40; G06T 15/005; G06T 15/80; G06T 2215/12; G06T 13/20; G06T 15/00; G06T 15/04; G06T 15/40; G06T 2200/28
See application file for complete search history.

(56) References Cited

PUBLICATIONS

Martin T, Engel W, Thibieroz N, Yang J, Lacroix J. Tressfx: Advanced real-time hair rendering. GPU Pro. May 20, 2014;5:193-209. (Year: 2014).*

Barringer R, Gribel CJ, Akenine-Möller T. High-quality curve rendering using line sampled visibility. ACM Transactions on Graphics (TOG). Nov. 1, 2012;31(6):1-0. (Year: 2012).*

Jansson ES, Chajdas MG, Lacroix J, Ragnemalm I. Real-Time Hybrid Hair Rendering. InEGSR (DL/I) 2019 (pp. 1-8). (Year: 2019).*

(Continued)

*Primary Examiner* — Xiao M Wu
*Assistant Examiner* — Scott E Sonners
(74) *Attorney, Agent, or Firm* — Leydig, Voit & Mayer, Ltd.

(57) ABSTRACT

A method for hair rasterization includes receiving hair data of hair strands, each hair strand including one or more hair segments; determining a first set of hair segments that is not fully occluded by one or more opaque objects; classifying each hair segment in the first set of hair segments into buckets corresponding to one or more tiles of pixels that the hair segment overlaps and one or more clusters arranged by depth per tile; for each tile, rasterizing the hair segments included in a first cluster for the tile, the first cluster for the tile being the cluster that is nearest to a location of a camera that includes at least one hair segment, and accumulating color and opacity for each pixel of the tile based on rasterizing the hair segments included in the first cluster; and combining the tiles that include rasterized hair segments into a hair overlay.

20 Claims, 21 Drawing Sheets

(56) References Cited

PUBLICATIONS

Kim TY. Algorithms for Hardware Accelerated Hair Rendering. InThe 30th International Conference on Computer Graphics and Interactive Techniques (SIGGRAPH 2003), San Diego, CA 2003. (Year: 2003).*

Sintorn E, Assarsson U. Real-time approximate sorting for self shadowing and transparency in hair rendering. InProceedings of the 2008 symposium on Interactive 3D graphics and games Feb. 15, 2008 (pp. 157-162). (Year: 2008).*

Sintom E, Assarsson U. Hair self shadowing and transparency depth ordering using occupancy maps. InProceedings of the 2009 symposium on Interactive 3D graphics and games Feb. 27, 2009 (pp. 67-74). (Year: 2009).*

Laine et al. "High-performance software rasterization on GPUs," HPG '11: Proceedings of the ACM SIGGRAPH Symposium on High Performance Graphics, pp. 79-88 (Aug. 2011) (available at: https://research.nvidia.com/sites/default/files/pubs/2011-08_High-Performance-Software-Rasterization/laine2011hpg_paper.pdf).

Kenzel et al. "A High-Performance Software Graphics Pipeline Architecture for the GPU," ACM Transactions on Graphics, vol. 37, Issue 4, pp. 1-15 (Aug. 2018) (available at: https://markussteinberger.net/papers/cuRE.pdf).

Kenzel et al. "On-the-fly Vertex Reuse for Massively-Parallel Software Geometry Processing," Proc. ACM Computer Graph. Interact. Tech., vol. 1, No. 2, Article 28 (Aug. 2018) (available at: https://www.tugraz.at/fileadmin/user_upload/Institute/ICG/Images/team_steinberger/Pipelines/HPG-2018_vertex_reuse-authorversion.opt.pdf).

Abrash, Michael. "Rasterization on Larrabee," Dr. Dobb's (May 1, 2009) (available at: http://www.cs.cmu.edu/afs/cs/academic/class/15869-f11/www/readings/abrash09_lrbrast.pdf).

Wikipedia. "Bresenham's line algorithm" (Aug. 7, 2020) (available at: https://web.archive.org/web/20200815212130/https://en.wikipedia.org/wiki/Bresenham's_line_algorithm).

* cited by examiner

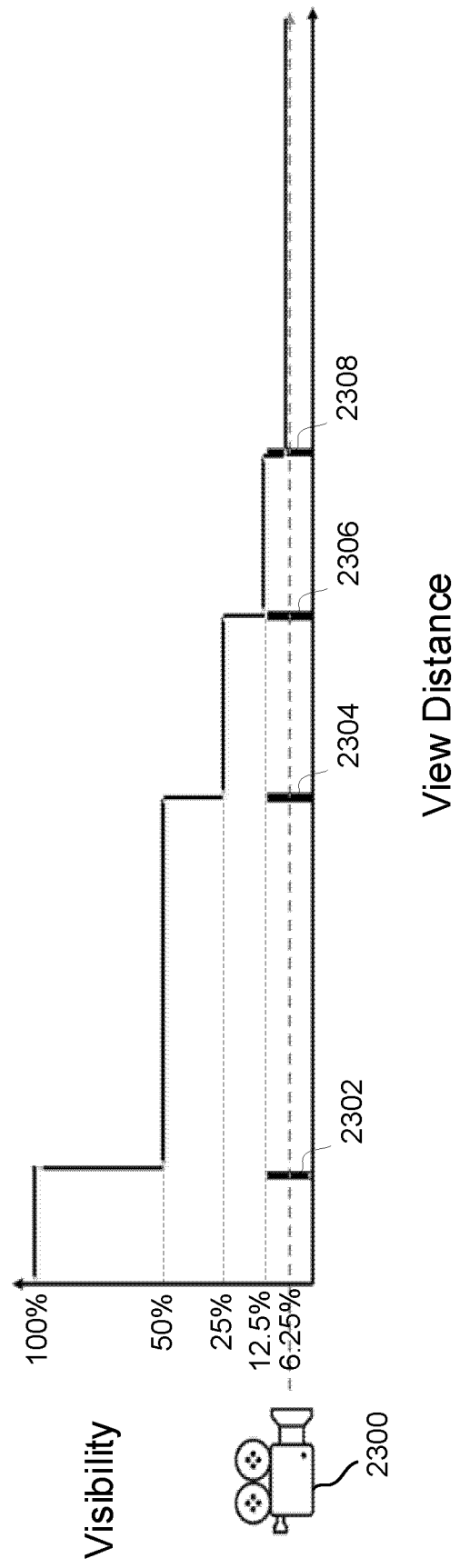

SYSTEMS AND METHODS FOR HAIR RASTERIZATION

CROSS-REFERENCE TO RELATED APPLICATIONS

This application claims the benefit of U.S. Provisional Application No. 63/078,959, filed on Sep. 16, 2020, the entire contents of which is hereby incorporated by reference.

FIELD

This disclosure generally relates to computer graphics and, more particularly, to systems and methods for hair rasterization.

BACKGROUND

For three-dimensional (3D) graphics applications, such as video games or animated films, efficient processing of data by reducing computational complexity of a given operation is often useful. This is particularly the case in real-time applications, such as video games.

Various operations can be performed using computer generated objects in a scene. An object may be represented as a polygonal mesh, which comprises a collection of vertices, edges, and faces that define the shape and/or boundary of the object.

Traditional graphics processing systems, such as GPUs (graphics processing units) or consoles, typically operate on triangle geometry. For rendering hair, however, GPUs are not well-suited.

Hair, if modeled using triangles, is often composed of many very long and thin triangles. This poses a problem for GPUs, which operate best on relatively larger triangles. For example, a hair strand of a character may include 30-60 individual segments that make up the hair strand. Since GPUs cannot handle line geometry, each hair segment is modeled using two thin triangles that make a thin rectangle. This modeling technique of using two thin triangles to model a hair segment is then repeated for each hair segment of the hair strand. This process is further repeated for each hair strand of an asset, and there may be several assets with hair in the image to be rendered As is evident, this technique of modeling hair using triangles involves a very large number of polygons. For a given character, the character may have 150,000 hair strands, with each hair strand including 30-60 hair segments, with each hair segment being modeled using 2 thin triangles. In one example, this results in approximately 18 million triangles to model the hair of just one character (e.g., 150,000 hair strands×60 hair segments×2 triangles per hair segment=18,000,000 triangles). What is more, this calculation merely accounts for hair on a character's head, and there may be other hair for the character, such as beard hair or eyebrow hair, for example. Further, approximately the same number of triangles would be needed for each character with hair. Given that the polygon budget for real-time applications, such as video games, is on the order of 2-3 million polygons per frame, a modeling technique for hair strands using triangles is not practical, since the triangle budget is completely blown several times over for the hair of just one character, leaving no budget for any of the other polygons of the character and overall scene.

As such, there remains a need in the art for an improved system and method for rendering hair.

SUMMARY

Embodiments of the disclosure provide a method, device, and computer-readable storage medium for hair rasterization. A method includes: receiving, by one or more processors, hair data for an asset, wherein the hair data includes one or more hair strands associated with the asset, and each hair strand includes one or more hair segments; determining, by the one or more processors, a first set of hair segments that is not fully occluded by one or more opaque objects relative to a location of a camera configured to capture an image of a scene that includes the asset; classifying, by the one or more processors, each hair segment in the first set of hair segments into one or more buckets corresponding to one or more tiles of pixels that the hair segment overlaps in screen space; for each bucket corresponding to a given tile of pixels, further classifying, by the one or more processors, each hair segment in the bucket for the given tile into clusters arranged by depth from the location of the camera; for each tile of pixels, rasterizing, by the one or more processors, the hair segments included in a first cluster for the tile, the first cluster for the tile being the cluster that is nearest to the location of the camera that includes at least one hair segment, and accumulating, by the one or more processors, color and opacity for each pixel of the tile based on rasterizing the hair segments included in the first cluster; and combining, by the one or more processors, the tiles of pixels that include rasterized hair segments to generate a hair overlay, wherein the hair overlay is configured to be applied on top of a rendered image of objects in the scene to add hair to the rendered image.

In one aspect, determining the first set of hair segments that is not fully occluded by one or more opaque objects relative to the location of the camera comprises: for each pixel in screen space, determining a distance from the location of the camera to a nearest opaque surface covered by the pixel as a per-pixel distance for the pixel; for each tile of pixels, aggregating the per-pixel distances for the pixels associated with the tile to determine a conservative depth value for the tile, wherein the conservative depth value is a value equal to the maximum per-pixel distance among the pixels of the tile; and determining that a hair segment is included in the first set of hair segments that is not fully occluded by one or more opaque objects based on determining that at least a portion of the hair segment is closer to the location of camera than the conservative depth value for the tile corresponding to the portion of the hair segment.

In one aspect, for a first tile of pixels, a dimension of the clusters for the first tile pixels in a depth direction relative to the location of the camera increases non-linearly with increasing distance from the location of the camera.

In one aspect, for a first cluster of a first tile, rasterizing a hair segment associated with the first cluster comprises: determining a number of pixels to raster for the hair segment; generating a one-pixel wide line for the hair segment based on the determined number of pixels to raster for the hair segment; for each pixel of the one-pixel wide line, perform a look up in a strand space shading storage to determine a color value for the pixel; convert each pixel of the one-pixel wide line to a two-pixel pair to generate a two-pixel wide line for the hair segment, wherein, for a given pixel of the one-pixel line, the determined color value for the given pixel is copied to the other pixel of the two-pixel pair for the given pixel; for each pixel pair that makes up the two-pixel wide line, distribute opacity between the two pixels of the two-pixel pair; and culling any occluded pixels by performing per pixel depth testing against opaque objects in the scene.

In one aspect, a first pixel pair includes a first pixel and a second pixel, and distributing opacity between the first pixel and the second pixel in the first pixel pair is based on determining relative coverage among the first pixel and the second pixel of a first hair segment that overlaps the first pixel and the second pixel.

In one aspect, the method further comprises generating color values stored in the strand space shading storage, which includes: receiving hair strand data for a first hair strand, wherein the hair strand data includes a root color for a root of the first hair strand, a tip color for a tip of the first hair strand, and information about how to interpolate color along the first hair strand from the root to the tip; sampling the hair strand at N number of locations along the first hair strand; culling sample locations corresponding to hair segments of the first hair strand that are not included in the first set of hair segments that is not fully occluded by one or more opaque objects to generate a set of visible sample locations for the first hair strand; performing shading at the visible sample locations; and storing the results of performing shading in the strand space shading storage.

In one aspect, for a first pixel of a first tile, accumulating color for the first pixel comprises: averaging color values associated with the pixels corresponding to rasterized hair segments included in the first cluster for the first tile that overlap a location the first pixel in screen space.

In one aspect, for a first pixel of a first tile, accumulating opacity for the first pixel comprises: receiving a buffer of opacity values corresponding to rasterized hair segments included in the first cluster for the first tile that overlap a location the first pixel in screen space, wherein the buffer of opacity values is sorted in order based on nearest distance to the location of the camera; and accumulating opacity for the first pixel based on the order of the opacity values in the buffer of opacity values.

BRIEF DESCRIPTION OF THE DRAWINGS

FIG. 23 is a conceptual diagram illustrating how to accumulate opacity, according to one embodiment.

DETAILED DESCRIPTION

Figure 1:
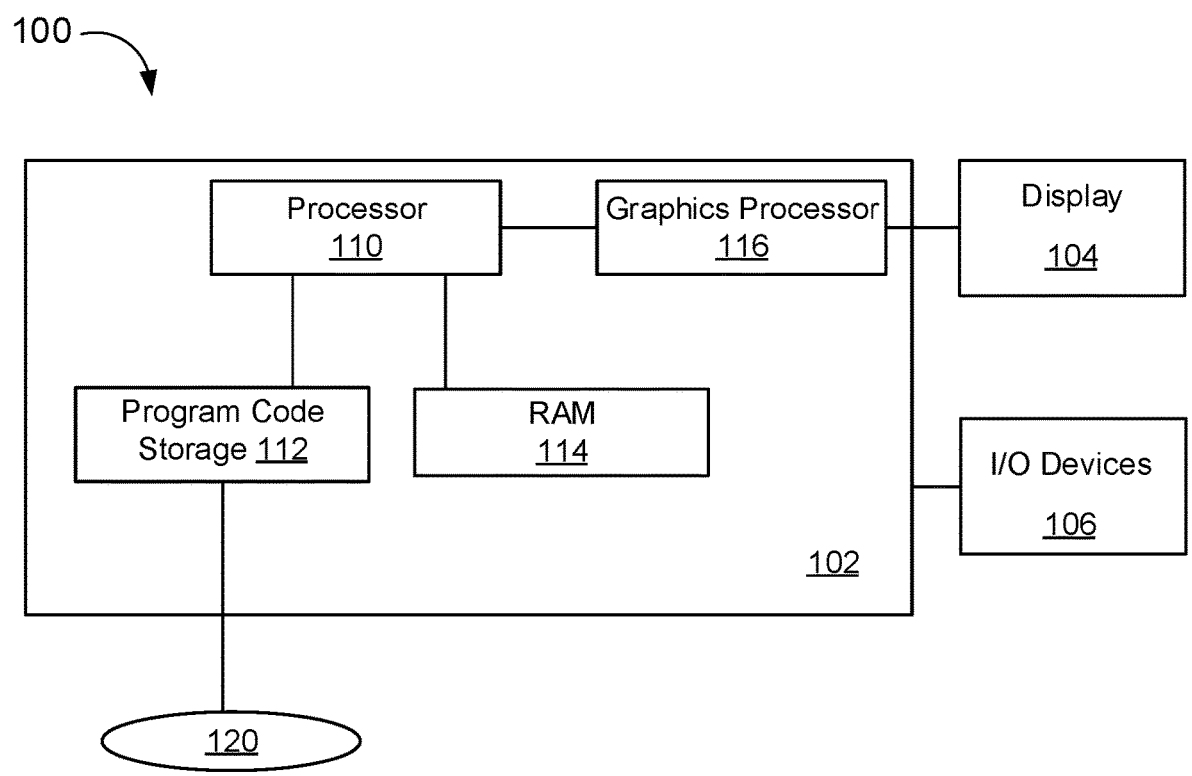
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

As described above, modeling hair using thin triangles is not practical using GPU hardware rendering for real time applications. Accordingly, embodiments of the disclosure provide a system and method for hair rasterization using a GPU that overcomes the limitations of existing approaches.

As will be described in greater detail below, embodiments of the disclosure provide systems and methods for rasterizing hair on a GPU. In some embodiments, the method for hair rasterization includes receiving hair strand data for an asset (e.g., a character). Each hair strand may be composed of multiple hair segments. In some embodiments, hair segments that are not visible to a camera are culled using conservative depth, which is described in greater detail below. Strand-space shading can be performed in some embodiments on the hair strands by evaluating shading at fixed anchor locations and storing these color values, as also described below.

According to various embodiments, a tile grid (for example, tiles of 8×8 pixels) is overlaid on the render target. The visible hair segments are placed in buckets corresponding to which tile the hair segment overlaps. The hair segments in each per-tile bucket can be further classified into clusters based on the depth of the hair segment into the scene from a camera location. Finally, the visible hair segments in each time are rasterized based on the depth-based clustering and the strand-space shading.

Taking the context of video games as an example, the display of a video game is generally a video sequence presented to a display device capable of displaying the video sequence. The video sequence typically comprises a plurality of frames. By showing frames in succession in sequence order, simulated objects appear to move. A game engine typically generates frames in real-time in response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=1/60 seconds. In some cases, a frame might represent the scene from t=0 seconds to t=1/60 seconds, but in the simple case, the frame is a snapshot in time.

A "scene" comprises those simulated objects that are positioned in a world coordinate space within a view pyramid, view rectangular prism, or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be non-human, simulated robots, or other character types.

In some cases, an artist-authored object that is visible in a scene can be composed of multiple sub-objects, each of which can be quite complex and include many surfaces. For example, for an object represented as a polygonal mesh, the object may be composed of a set of polygonal sub-meshes that form the complete object.

In some embodiments, hair is modeled (e.g., in Maya or 3D Studio Max) by artists using curves, in particular line primitives, and is not modeled as a polygonal mesh. A line primitive includes two vertices. To represent a hair strand, multiple line primitives are connected in a chain. Each line primitive shares its points with the neighboring line primitives. A chain of these line primitives forms what one would call a hair strand. Each individual primitive can also be called a hair segment.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
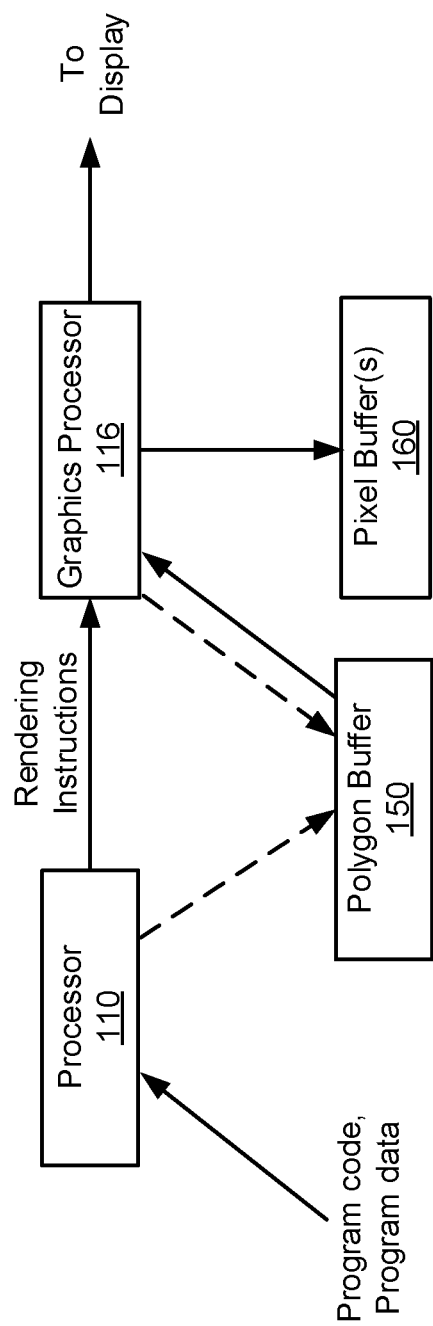
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, DirectX, Vulkan, proprietary console variants, or those specified by a graphics processor manufacturer, for example.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons. Also, in some embodiments, hair is modeled using curves (e.g., a series of interconnected vertices forming hair strands) and is not modeled as polygons.

Figure 3:
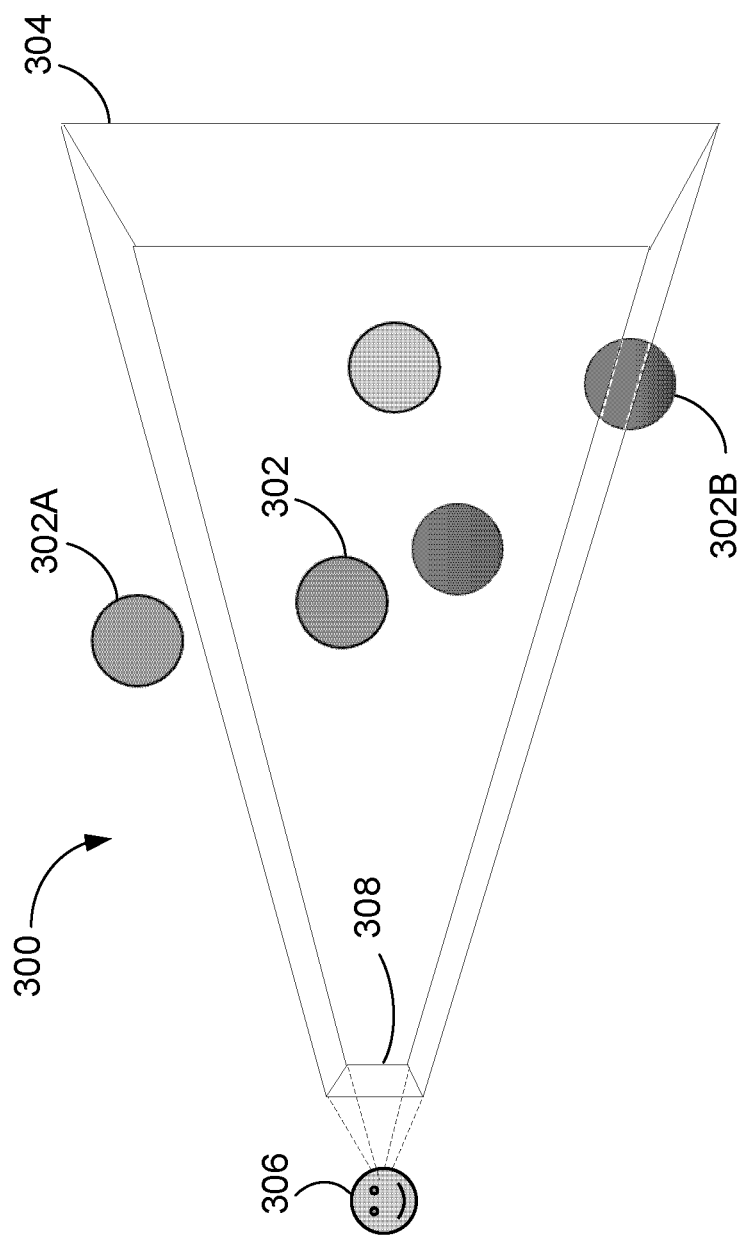
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects, including objects 302, 302A, 302B, for example. Each object can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects in the scene. Also, the objects can move in the scene 300.

Figure 4B:
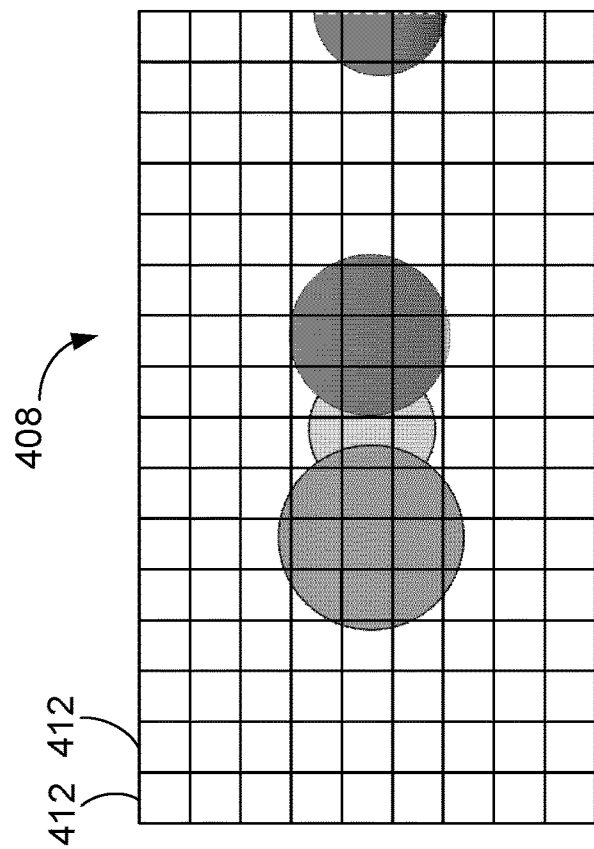
FIG. 4B is an example of an image of a scene, according to one embodiment.
Figure 4A:
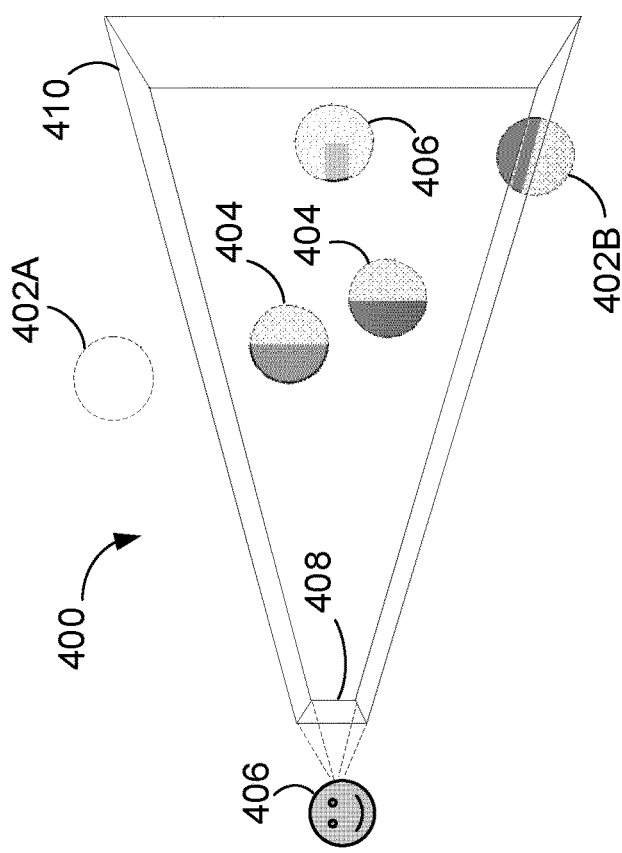
FIG. 4A is a block diagram illustrating rendering of a scene, according to one embodiment.

FIG. 4A is a block diagram illustrating rendering of a scene 400, according to one embodiment. Similar to the diagram shown in FIG. 3, scene 400 includes a plurality of objects. A camera 406 is configured to capture an image of the scene 400, represented in screen space 408. The camera 406 observes the scene 400 through viewport 410.

Various techniques can be used to render the scene 400 in screen space, including rasterization, ray tracing, or other techniques. Rasterization strives to render the pixels as those that are directly visible from the camera 406. In some implementations, rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of an image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image of the 3D scene.

Although rendering has been described herein using rasterization, other embodiments may involve rendering a scene using other techniques, such as ray tracing, ray casting, radiosity, or any other rendering technique or combination thereof.

Figure 5:
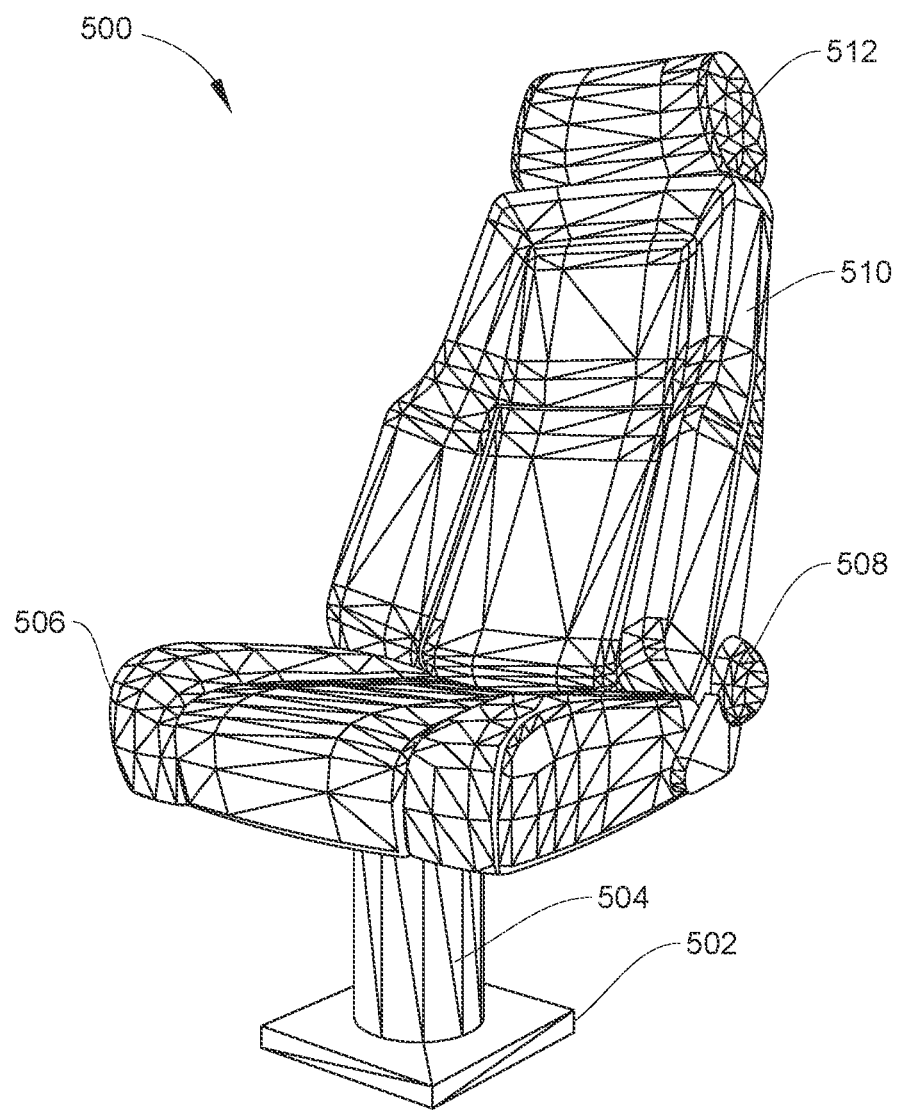
FIG. 5 is an example of a polygonal mesh, according to one embodiment.

FIG. 5 is an example of a polygonal mesh 500, according to one embodiment. As described, the polygonal mesh 500 may correspond to an artist-authored object. In the example shown, the object represents a chair. The polygonal mesh 500 comprises a collection of vertices, edges, and faces that define the shape and/or boundary of the artist-authored object. The faces may include various polygonal shapes, such as triangles, quadrilaterals, convex polygons, concave polygons, regular polygons (e.g., polygons that may have equal length sides and may have equal angles) and/or irregular polygons (e.g., polygons that may not have equal length sides and may not have equal angles).

In various embodiments, the polygonal mesh 500 may be comprised of one or more polygonal sub-meshes. Each sub-mesh may include a series of polygons. In the example shown in FIG. 5, the polygonal mesh is comprised of multiple sub-meshes 502, 504, 506, 508, 510, 512, where sub-mesh 502 represents a chair base, sub-mesh 504 represents a chair post, sub-mesh 506 represents a chair seat, sub-mesh 508 represents a chair handle, sub-mesh 510 represents a chair back, and sub-mesh 512 represents a chair headrest.

Figure 6:
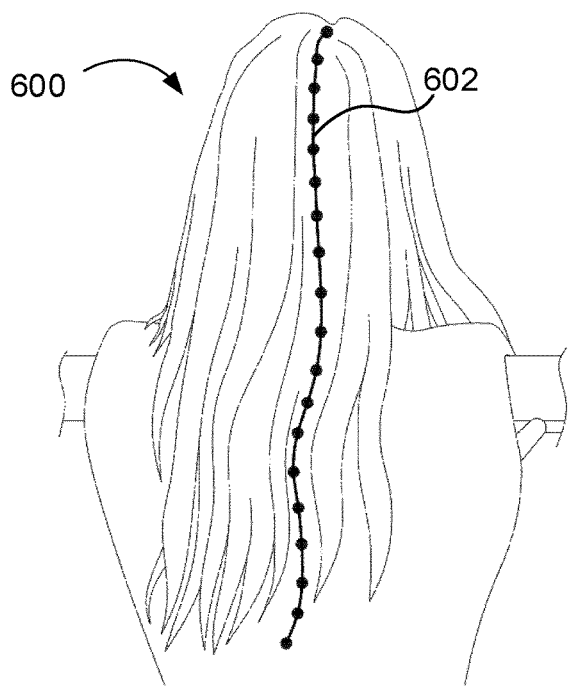
FIG. 6 is an example of a character, according to one embodiment.

FIG. 6 is an example of a character 600, according to one embodiment. A body of the character 600 may be modeled as a polygonal mesh. The hair of the model 602 may be modeled using hair strands, such as hair strand 602. In some implementations, there may be 100,000 or more hair strands for a single character.

Figure 7:
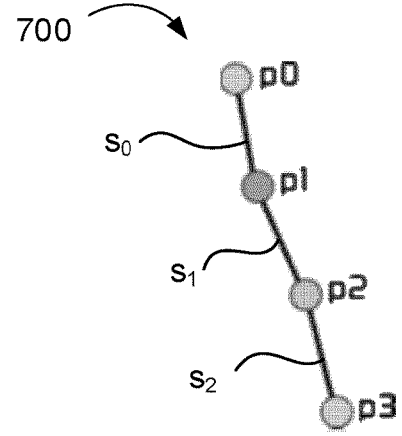
FIG. 7 is an example of a hair strand, according to one embodiment.

FIG. 7 is an example of a hair strand 700, according to one embodiment. The hair strand 700 is made up of vertices p0, p1, p2, p3. The vertices are connected serially to form hair segments. In FIG. 7, vertices p0 and p1 form hair segment so, vertices p1 and p2 form hair segment si, and vertices p2 and p3 form hair segment 52.

Figure 8:
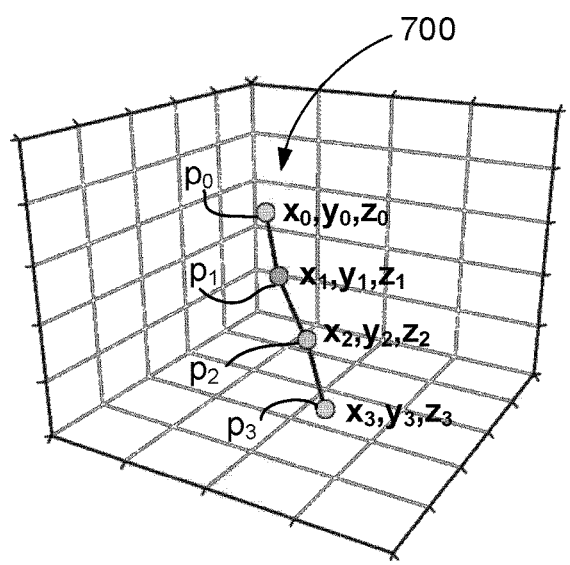
FIG. 8 is an example of hair strand shown in world space coordinates, according to one embodiment.

FIG. 8 is an example of hair strand 700 shown in world space coordinates, according to one embodiment. In three-dimensional (3D) world space coordinates, vertex p0 has coordinates $\{x_0,y_0,z_0\}$, vertex $p_1$ has coordinates $\{x_1,y_1,z_1\}$, vertex $p_2$ has coordinates $\{x_2,y_2,z_2\}$, and vertex $p_3$ has coordinates $\{x_3,y_3,z_3\}$.

In one embodiment, there is a separate memory storage for the vertex data (i.e., shown as table 802 in FIG. 8) and another storage in memory for the connectivity of vertices (i.e., shown as table 804 in FIG. 8). The vertex data includes a 3D coordinate giving the vertex a position in world space, while the index data (i.e., connectivity) describes which two vertices form a line primitive, i.e., a hair segment.

In the example shown in FIG. 8, there are four vertices; hence, the vertex data table 802 has four rows. These four vertices make up the hair strand 700, which includes three hair segments; hence, the index data table 804 table has three rows.

In some embodiments, there may be additional data for the vertices in the vertex data table 802, such as tangents (which may be useful for lighting and subdivision) as well as other metadata that allows for mapping a given vertex back to which hair strand identifier it belongs or to which local primitive ID (i.e., hair segment ID) within the hair strand it belongs.

In one embodiment of performing hair rasterization, the underlying geometry of the render target (e.g., character body) is rendered using standard polygon-based rendering and a hair overlay is generated using the disclosed embodiments. The hair overlay includes pixel level hair data. The hair overlay can be simply placed on top of the underlying geometry (rendered using standard polygon-based rendering) pixel-by-pixel to generate the final rendered image.

Figure 9:
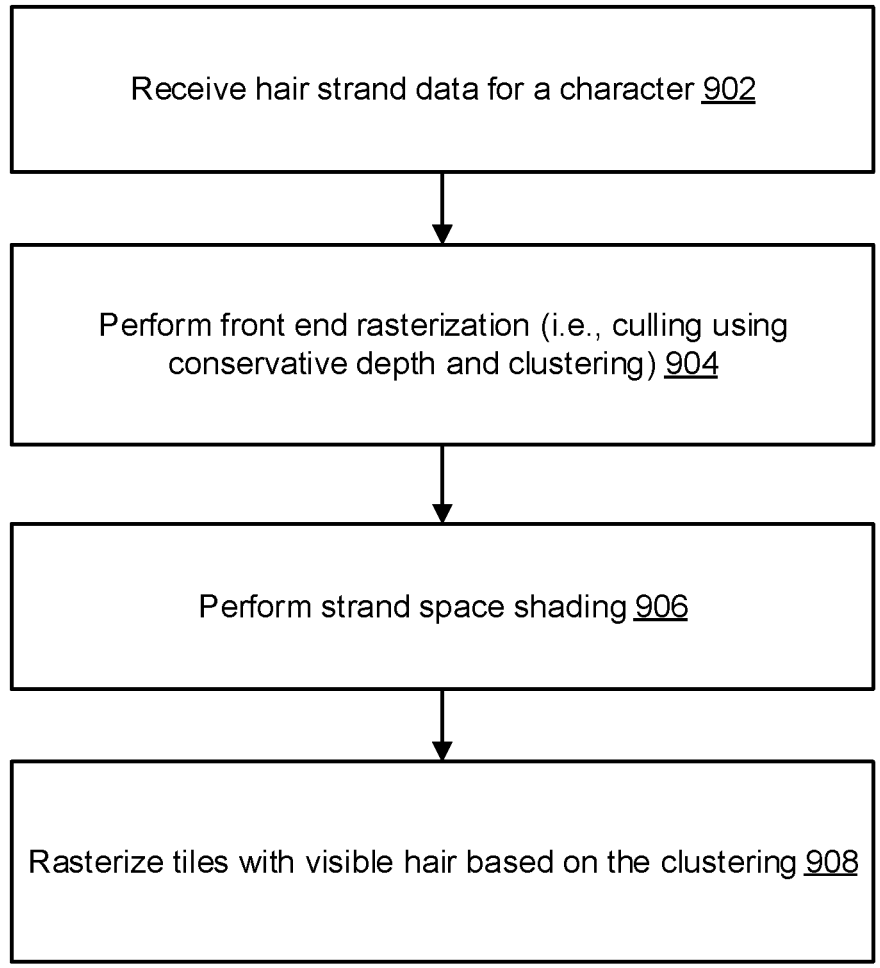
FIG. 9 is a flow diagram of method steps for performing hair rasterization, according to one embodiment.

FIG. 9 is a flow diagram of method steps for performing hair rasterization, according to one embodiment. In various implementations, the method can be performed by the processor 110, the graphics processor 116, or a combination of the processor 110 and the graphics processor 116. The flow diagram in FIG. 9, in one implementation, represents the overall process for hair rasterization for the hair of one character. More information about each step of the process is provided in greater detail in subsequent figures. The method can be repeated for each character with hair. In one embodiment, steps 902, 904, and 906 are repeated for every character, which builds up one or more buffers that contain the clustered hair segments. In an implementation using a single buffer, this buffer contains the hair segments for each character. Step 908, in some embodiments, is executed only once upon the buffer that contains all the clustered hair segments for each character. Doing so can be referred to as "batching". Batching may increase the performance of the hair rendered by a large magnitude because performing step 908 has some overhead. As such, steps 902, 904, and 906 inject their data into the cluster data structure (e.g., buffer) and then step 908 is performed once, regardless of how many characters there were in the scene with hair. Each segment can track which region from the strand space shading buffer to lookup their individual color from.

As shown, the method begins at step 902, where the processor receives hair strand data for a character. As described, an artist can model hair using hair strands made up of interconnected vertices. In some embodiments, the hair strands are sparsely modeled, and additional vertices for the hair strands can be generated by the processor at render time.

At step 904, the processor performs front end rasterization. In some embodiments, front end rasterization includes culling non-visible hair segments using conservative depth and clustering the hair segments into pixel tiles by depth. In this step, a tile grid is overlaid on the render target (e.g., grid of 8×8 pixel blocks). The processor coarsely identifies the tiles with visible hair using conservative depth testing. In some embodiments, conservative depth testing is based on coarsely culling hair segments based on the depth of nearest opaque object within the tile associated with the hair segment. In some embodiments, each tile can be divided into clusters in the depth direction, e.g., 32 clusters. Each cluster may have bounds that are preconfigured distance from a camera, except from the cluster that is the furthest distance from the camera, which has an outer bound of the maximum distance of the scene to be rendered. A given hair segments that passes the coarse culling by conservative depth testing is classified based on its depth, such that a given hair segment is associated with each cluster that it overlaps. Additional details for performing front end rasterization are provided in FIGS. 10-17.

At step 906, the processor performs strand space shading. In some implementations, hair shading varies slowly and predictably over the span of a single hair strand. Some embodiments evaluate shading of the hair strands at fixed anchor locations and store the color values for fixed anchor locations. Then, while producing the pixels covered by the hair segments, the rasterizer code can look up the two neighboring shading anchor points for the pixel and interpolate a value along the hair strand. Doing so allows the disclosed embodiments to run the shading at a varying rate if performance requires it and/or if the user so desires. While the hair strands may cover several hundreds of pixels, in some embodiments the rasterizer only evaluates the shading at the fixed anchor locations, and during rasterization the remaining color values are interpolated. Additional details of performing strand space shading are provided in FIGS. 18-19.

At step 908, the processor rasterizes tiles with visible hair based on the clustering and strand space shading. The result is a hair overlay that includes pixel level hair data. The hair overlay can be placed on top of the underlying geometry that is rendered using standard polygon-based rendering to generate the final image. Additional details are provided in FIGS. 20-23. In one embodiments, to place the hair overly on top of the opaque scene, the hair overlay is alpha blended based on what the hair alpha (i.e., opacity) for the final render target was. So, if the hair has accumulated to 90% alpha value, then when placing it over the scene, one embodiments lets 10% of the opaque background to leak through. In one implementation, alpha blending is performed using the "over" operator. This can be an image operation that occurs for every pixel.

Front End Rasterization

Figure 10:
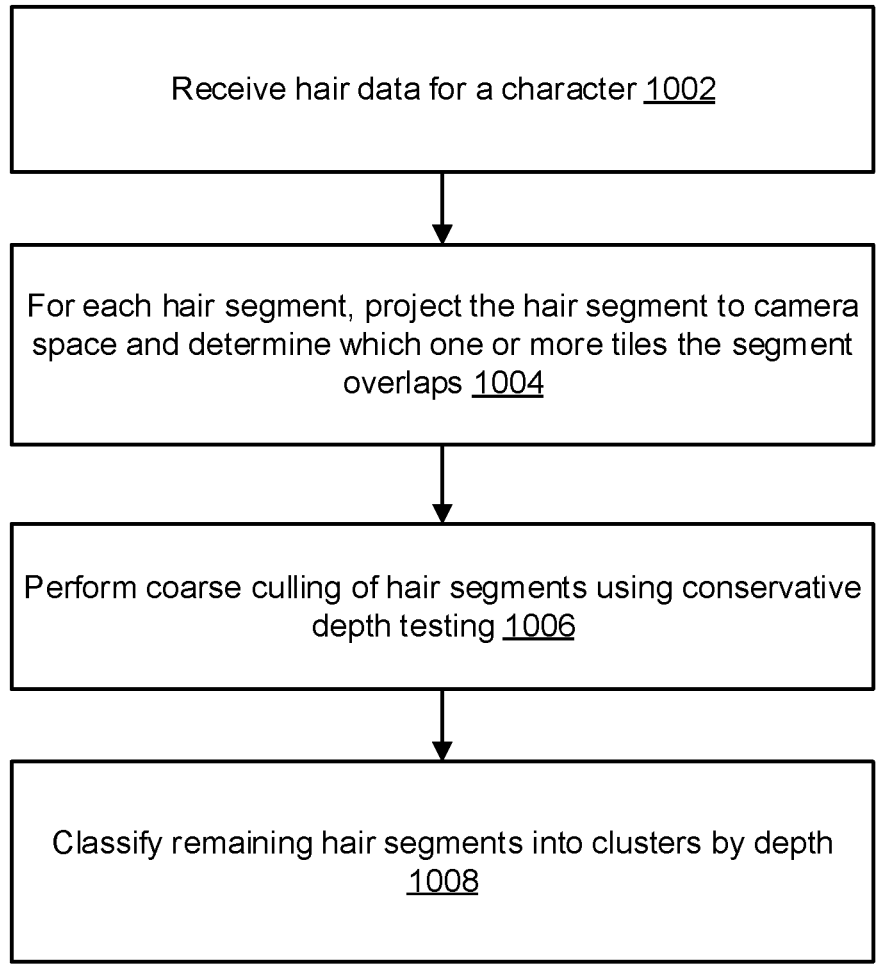
FIG. 10 is a flow diagram of method steps for performing front end rasterization, according to one embodiment.

FIG. 10 is a flow diagram of method steps for performing front end rasterization, according to one embodiment. In various implementations, the method can be performed by the processor 110, the graphics processor 116, or a combination of the processor 110 and the graphics processor 116. The flow diagram in FIG. 10, in one implementation, represents more detail about step 904 in FIG. 9.

As shown, the method begins at step 1002, where the processor receives hair data for a character. As described, an artist can model hair using hair strands made up of interconnected vertices. In one embodiment, the hair data received at step 1002 is a buffer of vertex and connectivity data of the hair of a character, see, e.g., the tables in FIG. 8. The vertex and connectivity data provides the information to determine the individual hair segments of the hair strands of the character. Each hair segment may be assigned a hair segment identifier (ID). Each hair strand is assigned a hair strand ID. In one implementation, the hair segment ID as well as the hair strand ID are what allows the processor to lookup the correct shading values from the strand space shading storage when doing the actual rasterization.

At step 1004, for each hair segment, the processor projects the hair segment to camera space and determines which one or more tiles the hair segment overlaps. In some embodiments, hair rasterization is based on breaking down a render target into tiles. There can be various ways to implement this step. In one embodiment, the hair segments are processed in parallel where each thread picks one hair segment and then traverses the screen-space tiles it overlaps. The processor grabs one hair segment and walks the tiles doing binning. This embodiment has tile traversal logic since there would be one processor configured for a tile. Alternatively, in another embodiment, the tiles are processed in parallel, where a processor has mutually exclusive access to a tile, and the processor loops over the hair segments one by one. In some implementations, an intermediate acceleration structure is used that groups the hair segments into "local" chunks, which themselves are bounded by an AABB (axis aligned bounding box). Then we would only loop over groups of hair, rather than individual hair segments, that are spatially chunked and then perform overlap tests of their associated AABB against the screen-space tiles then would accelerate this process. Rather than touching segments one by one, this implementation would just submit all the hair segments within the AABB in one shot into the tile, making this step much faster. As such, several implementation strategies are possible. AABB may be one of the better performing implementations, but requires preprocessing of the hair segments into localized groups with AABB bounds. Also, in some implementations, for animated hair, these AABBs are updated every frame, but static hair does not update every frame. This also means we could perform the coarse culling against the smaller AABBs for groups of hair rather than individual segments to accelerate the process. In some implementations, one could even have multiple levels/hierarchical culling tests, where we do AABB as well as individual segments of what survived culling.

Figure 11:
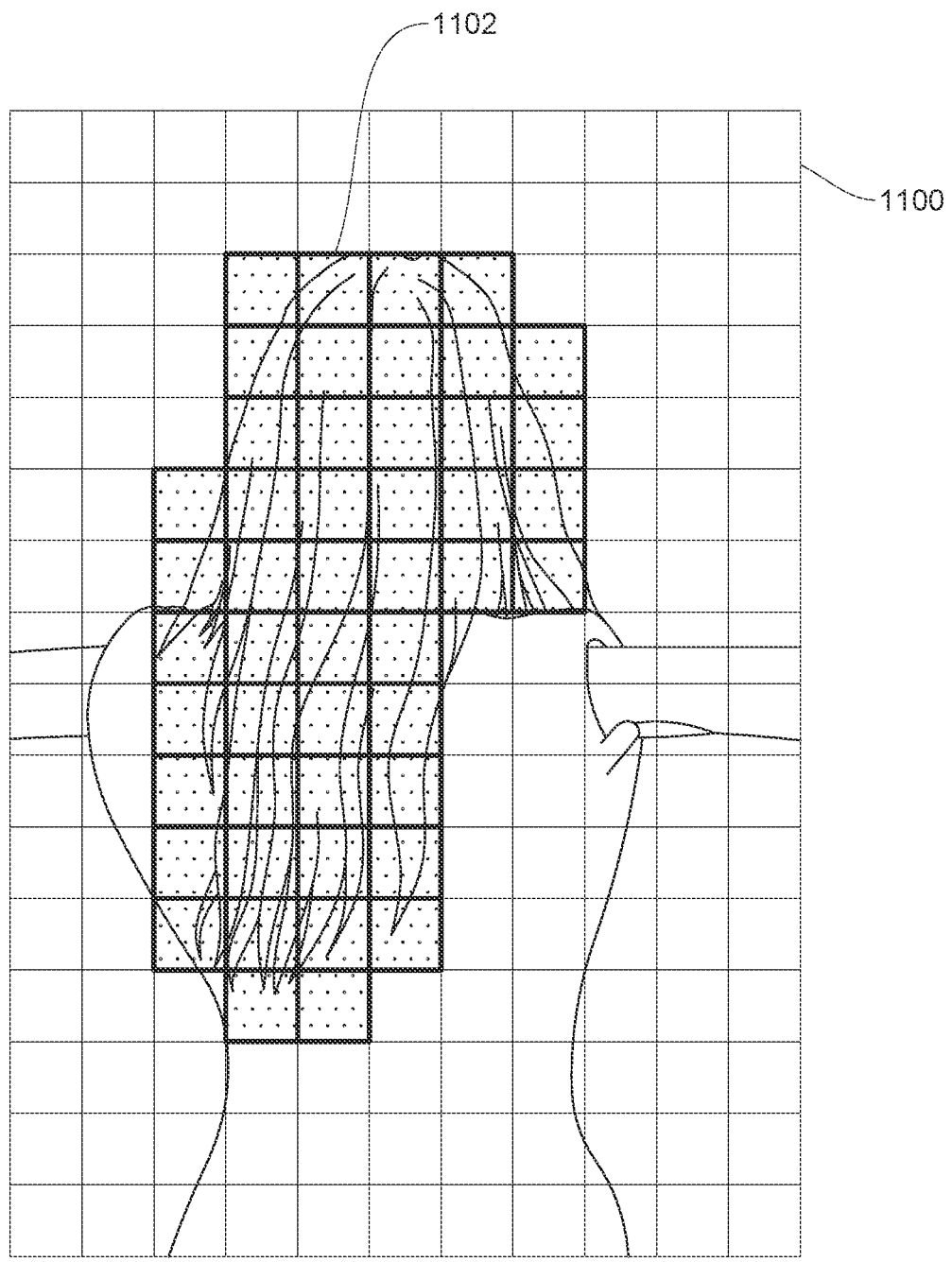
FIG. 11 is an example of a tile grid overlaid on top of a render target, according to one embodiment.

FIG. 11 is an example of a tile grid 1100 overlaid on top of a render target, according to one embodiment. As an example, the tile grid 1100 is formed of 8×8 pixel blocks. In various embodiments, the number of pixels in each tile of the tile grid 1100 is configurable. Tiles 1102 in bold outline in the example in FIG. 11 are tiles that include hair segments that overlap the tiles 1102. It is noted that even if a hair segment is completed occluded by opaque objects, such a hair segment would still be considered to overlay the corresponding tile. Culling of the hair segments is taken into account at a later processing stage.

Figure 12:
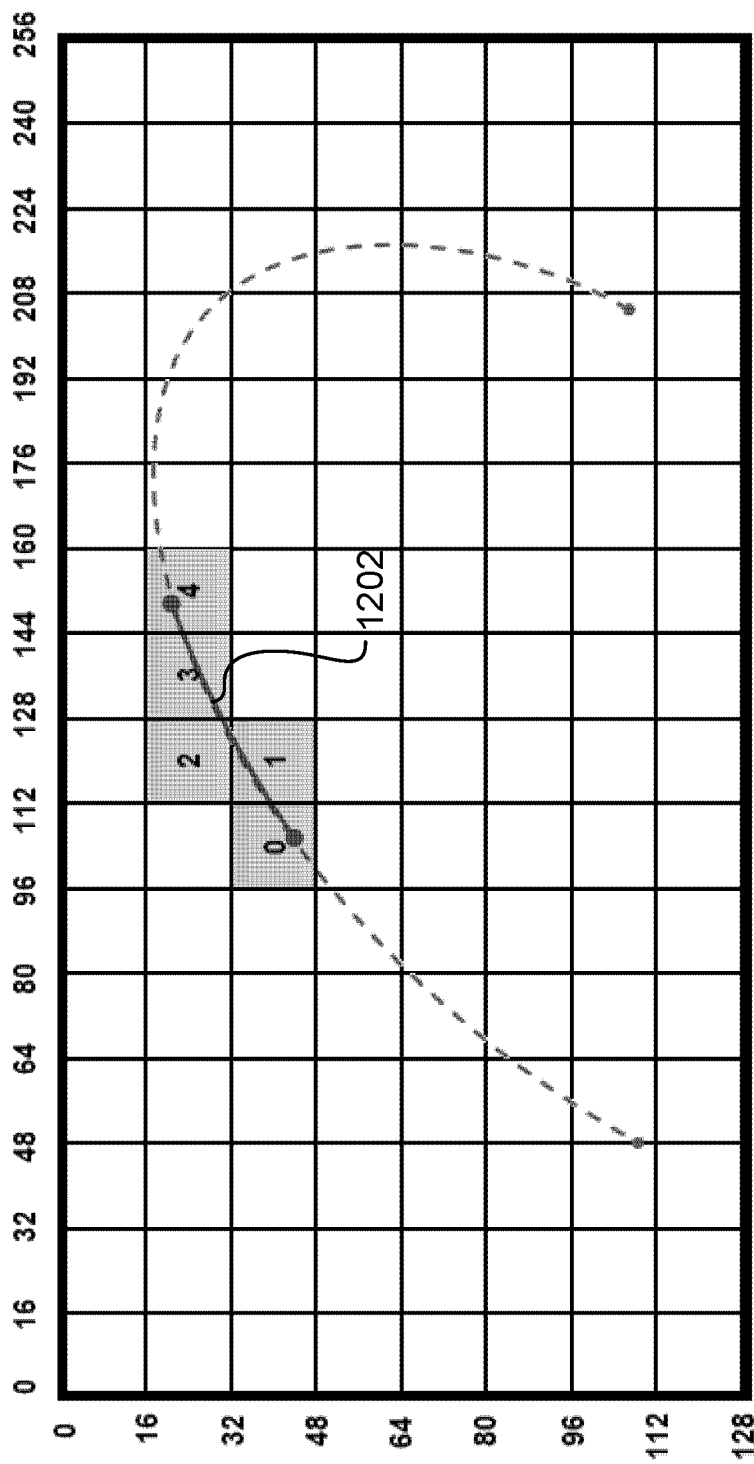
FIG. 12 is an example of a hair segment that overlaps multiple tiles, according to one embodiment.

In one embodiment, to implement step 1004 on a GPU, one thread is launched per hair segment. The GPU projects the hair segment into camera space given the world space coordinates of the two vertices of the hair segment and the camera location. In some implementation, a single hair segment can overlap one or more tiles. FIG. 12 is an example of a hair segment 1202 that overlaps multiple tiles, according to one embodiment. In the example shown, the hair strand overlaps five (5) tiles, labeled with identifiers 0, 1, 2, 3, 4 in FIG. 12. After concluding step 1004, the result is a buffer for each tile with the hair segment IDs of the hair segments that overlap (at least partially) the corresponding tile. In one embodiment, the hair segment ID is stored in the "primitive list" buffer owned by the tile. Each cluster owns a subset/range of primitives in the primitive list. Each segment submits other metadata as well such as strand ID, vertex pair identifiers (which can be implemented in various ways). One implementation simplifies it to be VertexID and next one is always located +1 (plus one). These metadata information can be used during rasterization for vertex lookup, tangent lookup, shading lookup, etc.

At step 1006, the processor performs coarse culling of hair segments using conservative depth testing. After concluding step 1006, the result is a coarsely culled buffer for each tile with hair segment IDs of the hair segments that are potentially visible in the given tile as not being occluded by opaque objects. One embodiment for performing conservative depth testing is described in FIG. 13.

Figure 13:
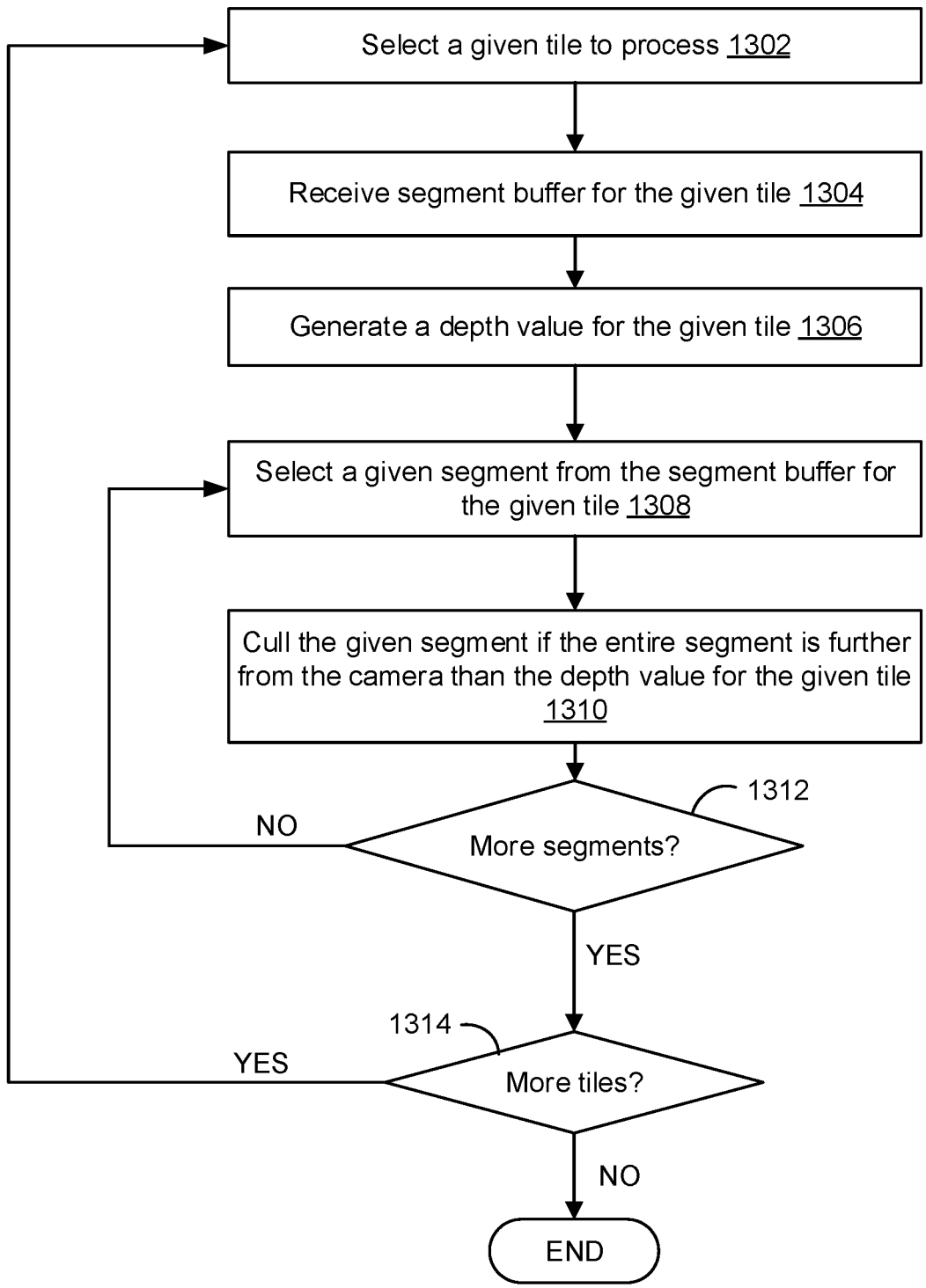
FIG. 13 is a flow diagram of method steps for performing conservative depth testing, according to one embodiment.

FIG. 13 is a flow diagram of method steps for performing conservative depth testing, according to one embodiment. In various implementations, the method can be performed by the processor 110, the graphics processor 116, or a combination of the processor 110 and the graphics processor 116.

At step 1302, the processor selects a given tile to process. At step 1304, the processor receives a segment buffer for the given tile. The segment buffer includes the hair segments that at least partially overlap the tile, e.g., the results of performing step 1004 in FIG. 10.

At step 1306, the processor generates a depth value for the given tile (i.e., a so-called "conservative depth" value for the tile).

Figure 14:
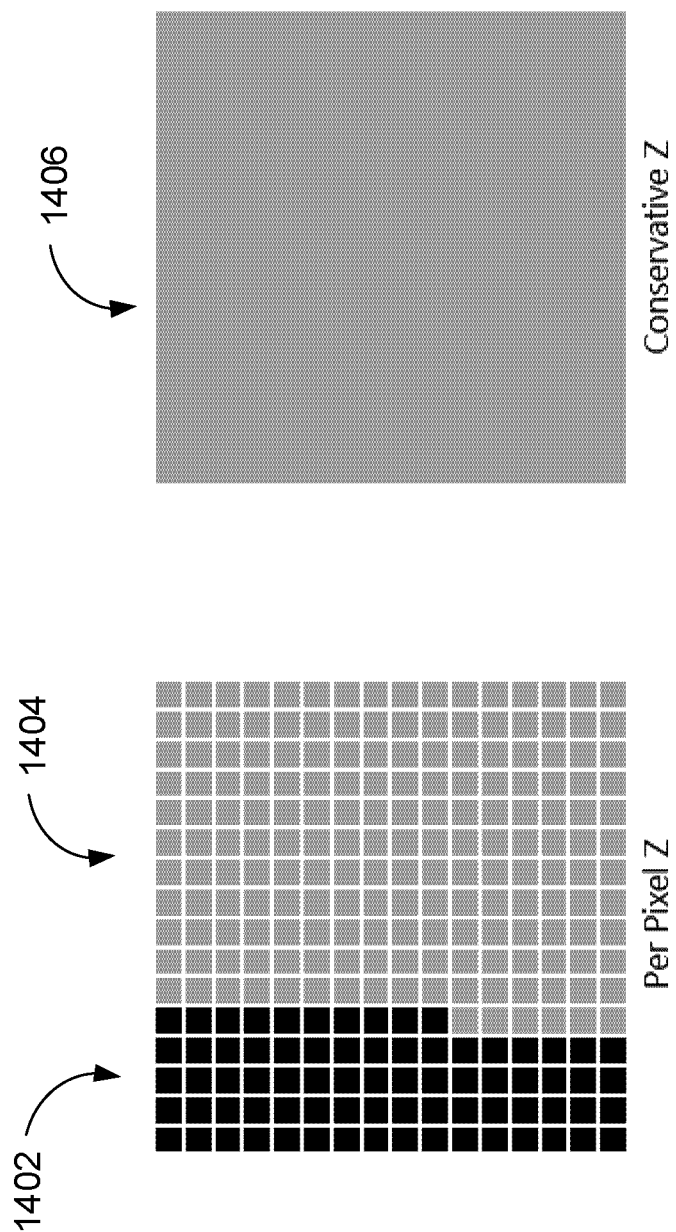
FIG. 14A is an example of a tile of pixels, according to one embodiment.
FIG. 14B illustrates a depth value for the tile of pixels shown in FIG. 14A, according to one embodiment.

FIG. 14A is an example of a tile of pixels, according to one embodiment. For each pixel of the tile of pixels, the per pixel distance to the nearest opaque surface in the given pixel is determined. Each pixel is thus associated with one distance. As described, characters can be modeled using polygonal meshes and hair can be modeled using hair strands including hair segments. To determine the per pixel distance to the nearest opaque surface, the hair geometry is ignored. In the example in FIG. 14, the pixels in pixel set 1402 are associated with a first distance that is the distance to the nearest opaque surface in each pixel in the pixel set 1402, and the pixels in pixel set 1404 are associated with a second distance that is the distance to the nearest opaque surface in each pixel in the pixel set 1404. In one example, the second distance (which is the single distance that corresponds to each of the pixels in the pixel set 1404) is further to the camera than the first distance (which is the single distance that corresponds to each of the pixels in the pixel set 1402). To determine the depth value for the given tile, the furthest per pixel distance among the pixels in the tile is used as the depth value for the tile of pixels.

FIG. 14B illustrates a depth value 1406 for the tile of pixels shown in FIG. 14A, according to one embodiment. The depth value for the given tile pixel is referred to as the "conservative depth" of the tile. As discussed, each pixel is associated with a single distance value. In FIG. 14A, the pixels in the tile are either associated with the first distance value (i.e., the pixels in pixel set 1402) or a second distance value (i.e., the pixels in pixel set 1404), where the second distance value is further from the camera than the first distance value. As such, the second distance is selected as the depth value 1406 for the given tile. In one embodiment, all pixels of the tile are visited serially, and the processor calculates the maximum value of the set. In another embodiment, the pixels of the tile can be visited in parallel. To implement parallel processing, one embodiment performs the test hierarchically by reducing the set by half each time. Each thread picks two values and you repeat this step. For 8×8 tiles, you have 64 pixels so it takes 6 steps, i.e., $Log_2(64)$. The algorithm for the parallel case is called "parallel reduction" and is well suited for GPUs.

Referring back to FIG. 13, at step 1308, the processor selects a given segment from the segment buffer for the given tile. At step 1310, the processor culls the given segment if the entire segment is further from the camera than the depth value (i.e., the conservative depth value) for the given tile. In one embodiment, the given segment includes a first vertex and a second vertex, the first vertex corresponds to a first depth relative to the camera, and the second vertex corresponds to a second depth relative to the camera. If the first depth of the first vertex and the second depth of the second vertex are both further from the camera than the depth value determined at step 1306 for the given tile, then the hair segment can be culled as fully occluded by opaque objects.

At step 1312, the processor determines whether there any more segments to process for the given tile. If yes, the method returns to step 1308 described above. If no, the method proceeds to step 1314. Although the method in FIG. 13 shows segments processed serially, in some embodiments, segments can be processed in parallel (i.e., by tile), as described above.

At step 1314, the processor determines whether there any more tiles to process. In one embodiment, only those tiles that have hair segments that overlap the tiles are processed. See, for example, FIG. 11, which shows tiles 1102 in bold outline that hair segments that overlap the tiles. If the processor determines that there are more tiles to process, the method returns to step 1302 described above, where the next tile with overlapping hair segments is selected. If no more tiles are left to be processed, the method terminates. Although the method in FIG. 13 is shown to serially process the separate tiles with overlapping hair and the hair segments within a tile, it should be noted that these processes can be performed in parallel, e.g., by launching separate GPU threads.

Referring back to FIG. 10, after performing coarse culling of hair segments using conservative depth testing at step 1006, the method proceeds to step 1008.

At step 1008, the processor classifies remaining hair segments into clusters by depth.

Figure 15:
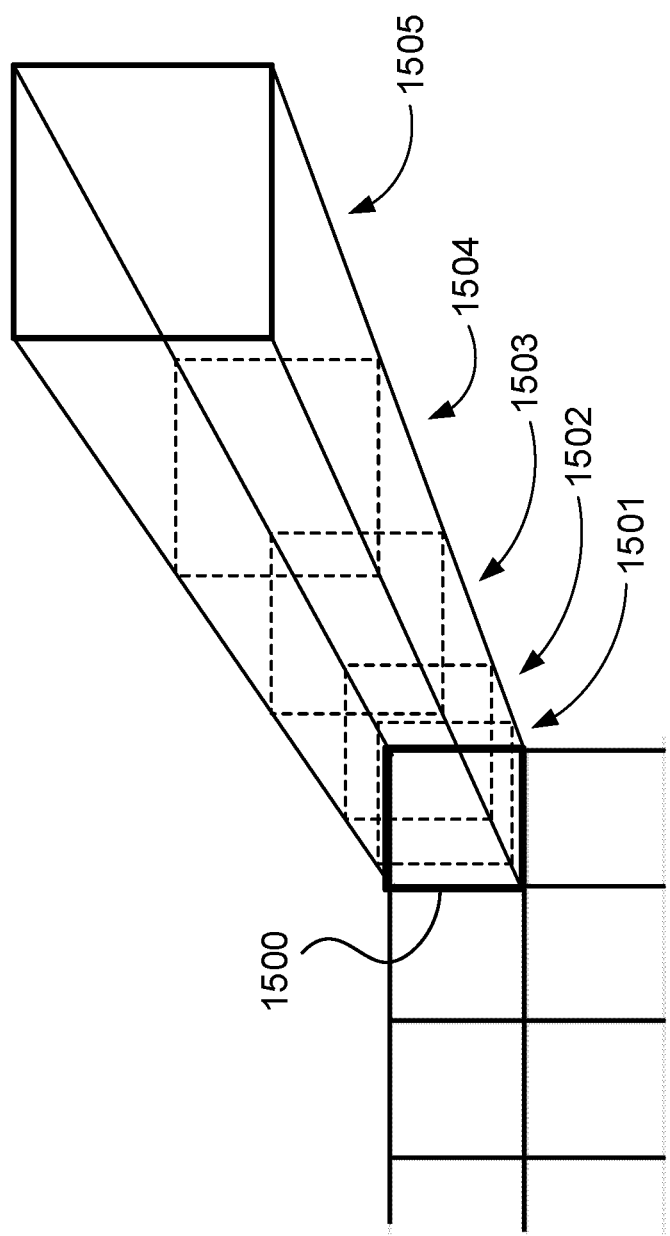
FIG. 15 illustrates a tile organized into clusters by depth, according to one embodiment.

FIG. 15 illustrates a tile organized into clusters by depth, according to one embodiment. In some embodiments, each tile can be divided into clusters in the depth direction, e.g., 32 clusters. The number of clusters for each tile is configurable. Each cluster may have bounds that are a preconfigured distance from a camera location. The last cluster (away from the camera) may have an outer bound set to the maximum distance of the scene to be rendered. According to some embodiments, a given hair segment can classified based on its depth, such that a given hair segment is classified with the cluster(s) that the hair segment overlaps.

Figure 16:
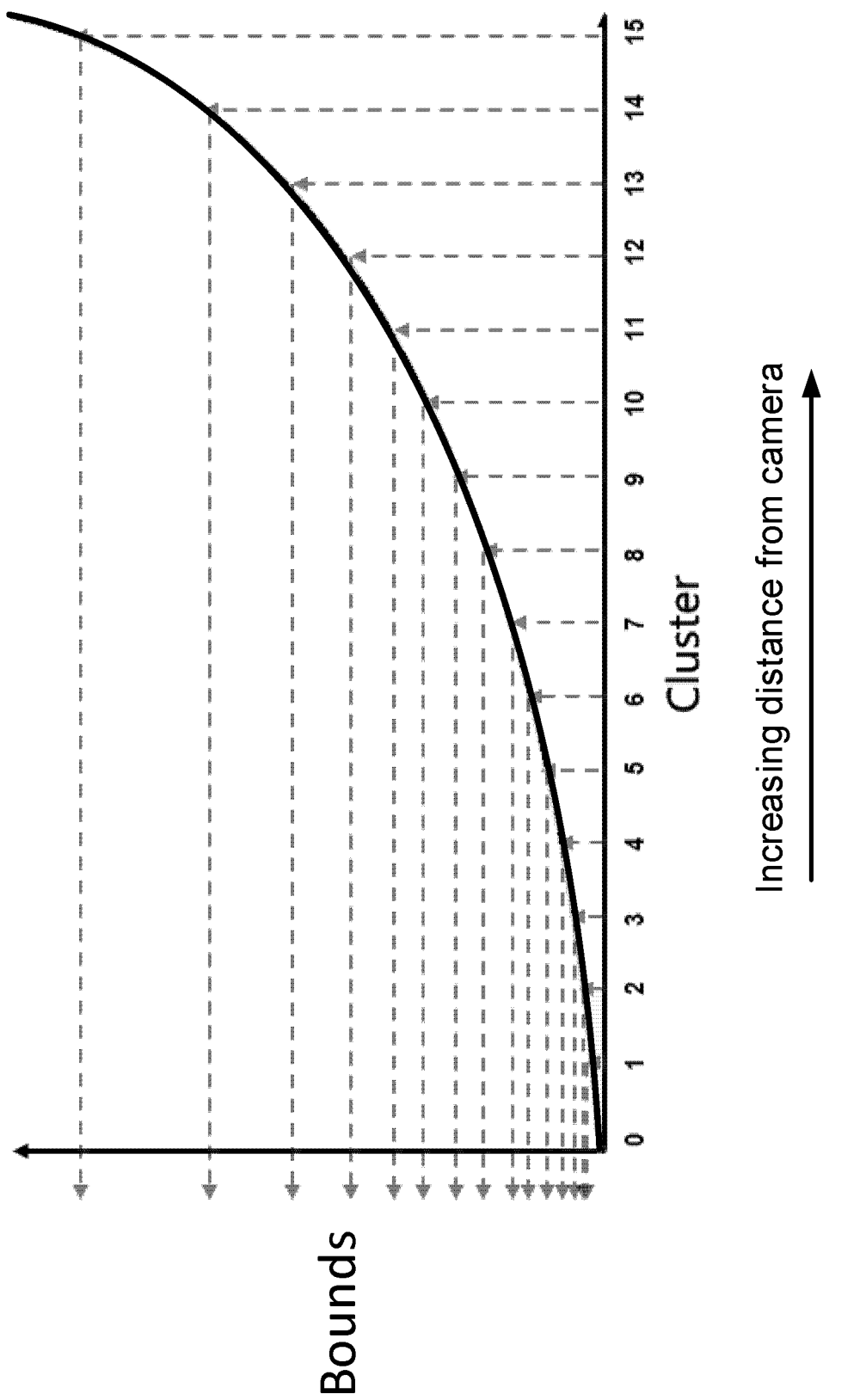
FIG. 16 is graph illustrating how the bounds of each cluster with increasing distance from the camera, according to one embodiment.

FIG. 15 shows an example of tile 1500. The tile is broken down into five (5) clusters in the depth direction, i.e., clusters 1501, 1502, 1503, 1504, 1505. As shown in the example in FIG. 15, the bounds (in the depth direction) of each cluster vary non-linearly, such that the distance between inner and outer cluster bounds increases with each successive cluster with distance from the camera. FIG. 16 is graph illustrating how the bounds of each cluster increase with increasing distance from the camera, according to one embodiment. For each tile, a hair segment is clipped to the view frustum for the tile (i.e., in the x- and y-directions). In some embodiments, if a hair segment spans two clusters (in the z-direction), the hair segment can be clipped at the cluster boundary between the two clusters and divided into two sub-segments, each sub-segment being classified into its respective cluster.

After hair segments for the tile have been classified by cluster, there may be some clusters that have no hair segments. The clusters within a tile that include at least one hair segment or portions thereof are referred to "active clusters," and the clusters within a tile that include no hair segments or portions thereof are referred to "inactive clusters."

Figure 17:
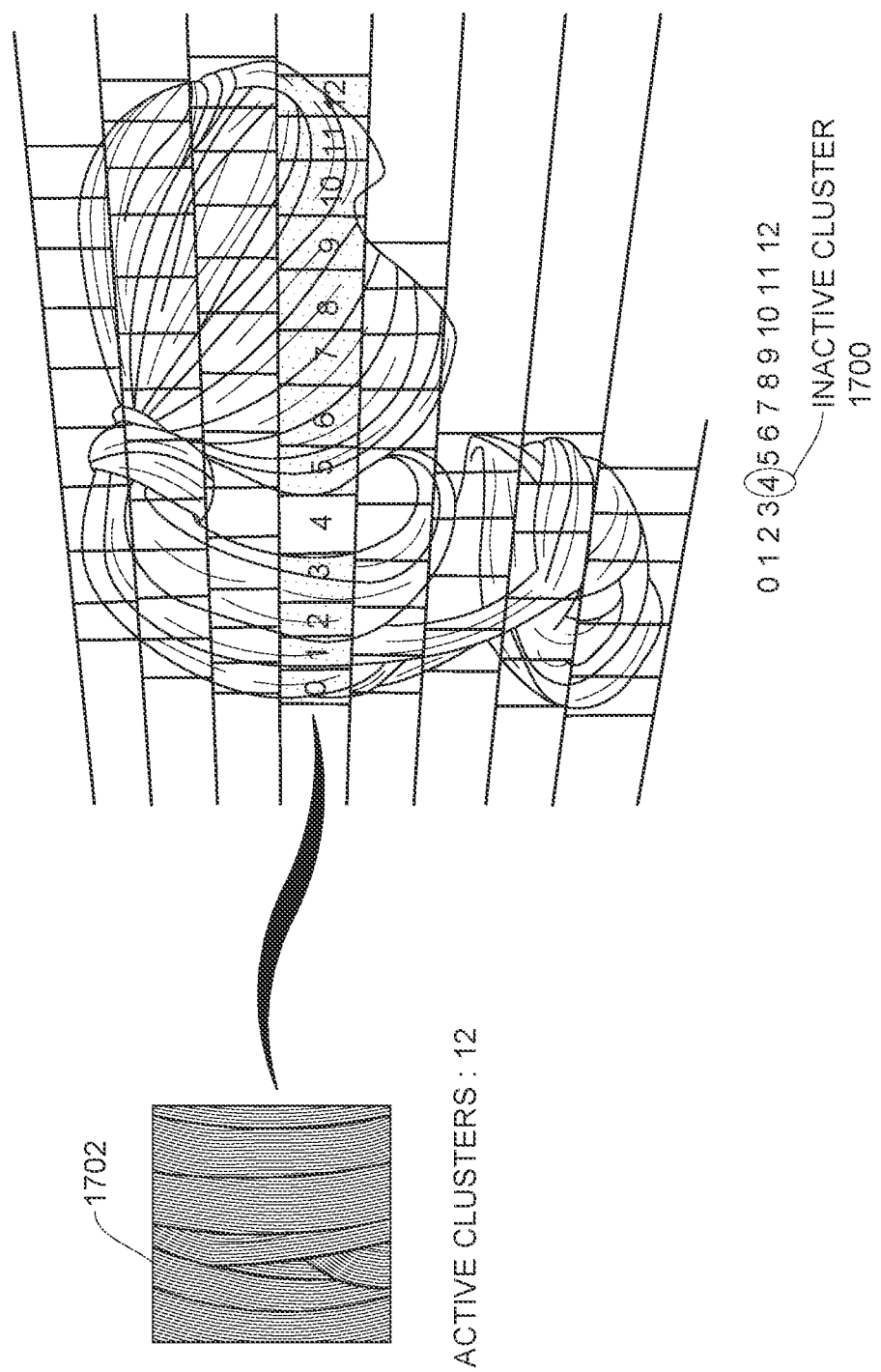
FIG. 17 illustrates active and inactive clusters for a given tile, according to one embodiment.

FIG. 17 illustrates active and inactive clusters for a given tile, according to one embodiment. In the example shown, tile 1702 is selected. In this example, the tile can be organized into thirteen (13) clusters, numbered 0 to 12, in the depth direction. In FIG. 17, clusters 0 to 3 and clusters 5 to 12 are "active" clusters, since these clusters include hair segments or portions thereof. Cluster 4 is an "inactive" cluster 1700, as it does not include any hair segments or portions thereof.

Referring back to FIG. 10 (i.e., performing front end rasterization), once the method is completed, the result is that occluded hair segments have been coarsely culled, and the remaining hair segments have been classified by tile and by cluster (by depth) within the tile. In one embodiment, the method in FIG. 10 is repeated for all the assets (for example, assets with hair), so we end up having classified every hair asset. Then, the final rasterization is executed once. For example, for a scene with five (5) characters, the frontend rasterization and strand space shading is repeated five (5) times. These processes write to the same buffer, in one implementation. Then, one instance of rasterization is performed, which visits the active clusters and generates the pixels in front to back order. As described above, this implementation is called "batching," since we do not perform immediate rendering, but batch everything and prepare one large data structure and then do one rasterization in one shot.

Strand Space Shading

As described in FIG. 9, after performing front end rasterization at step 904, strand space shading is performed at step 906. In some embodiments, strand space shading refers to decoupling the shading of hair strands from the screen coverage. In some implementations, hair shading varies slowly and predictably over the span of a hair strand. Some disclosed embodiments evaluate the shading of hair strands at fixed anchor locations and store these color values. Then, while producing the pixels covered by the hair segments, the rasterizer code can look up the two neighboring shading anchor points and interpolate the color value between the two neighboring shading anchor points along the hair strand. Doing so provides a significant improvement in performance, especially when there are many layers of hair that need to be rendered over each other. Performing strand space shading also allows the disclosed embodiments to run the shading at varying rate if performance requires it and/or if the user so desires.

In some embodiments, while the hair strands may cover several hundreds of pixels in the image, the rasterizer evaluates the shading at anchor points (i.e., sample points) and during rasterization the remaining color values are interpolated. While it is possible to have implementations that do the shading during rasterization on the anchor points, one implementation is to do it all pre-rasterization. So, once all the culling and shading is done, then we launch the rasterizer (batching again), which then will look up and interpolate the nearest two values for a generated pixel.

Figure 18:
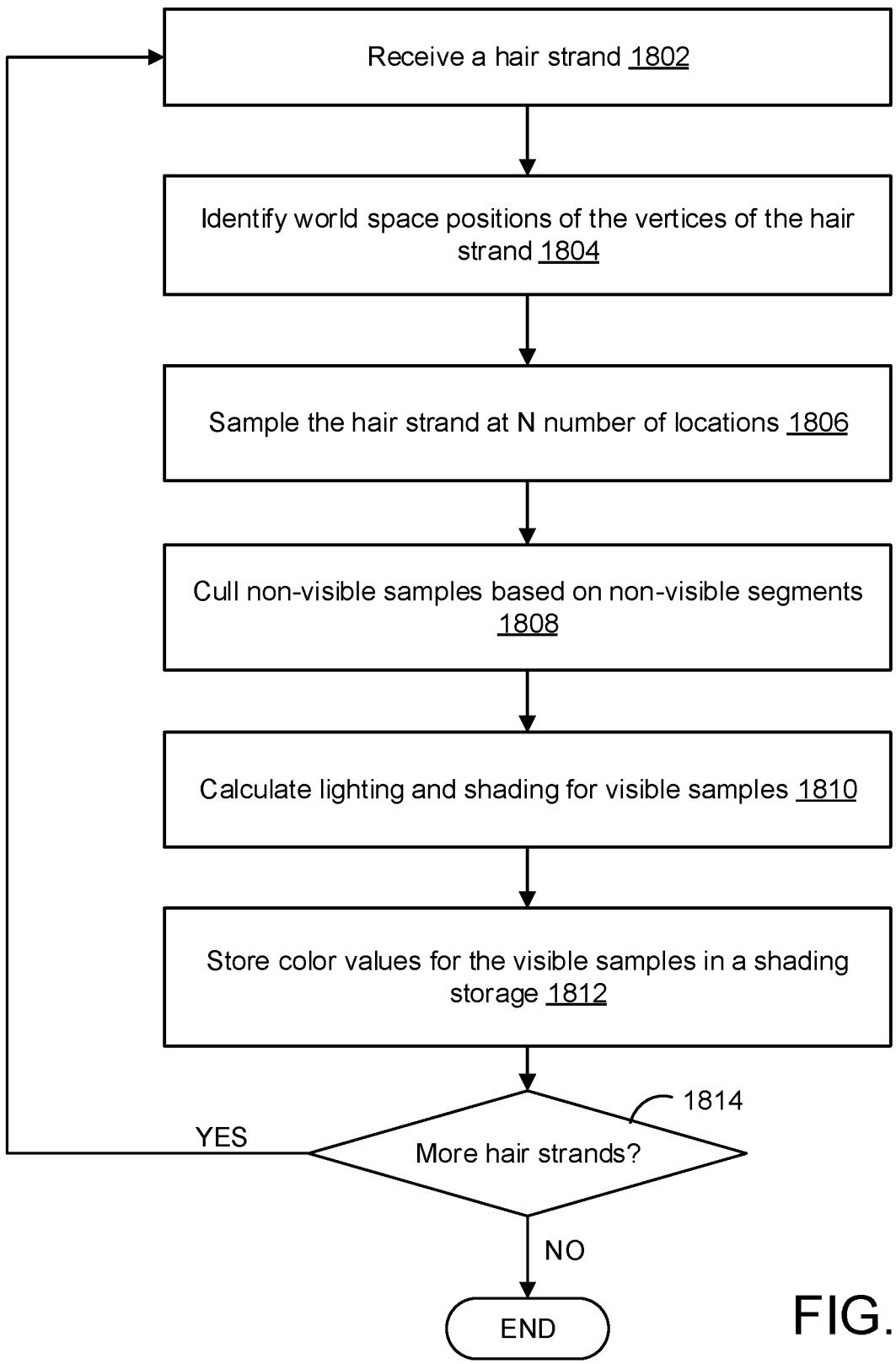
FIG. 18 is a flow diagram of method steps for performing strand space shading, according to one embodiment.

FIG. 18 is a flow diagram of method steps for performing strand space shading, according to one embodiment. In various implementations, the method can be performed by the processor 110, the graphics processor 116, or a combination of the processor 110 and the graphics processor 116. The flow diagram in FIG. 18, in one implementation, represents more detail about step 906 in FIG. 9.

As shown, the method begins at step 1802, where the processor receives a hair strand to process. As described, hair strands are modeled by an artist. In one implementation, each hair strand is made up of hair segments defined by vertices and interconnections between the vertices. In some embodiments, the hair strands are sparsely modeled, and the processor is configured to up-sample the hair strands to add additional virtual vertices to improve the visual quality of the hair strand. Each hair strand includes a root (e.g., attached to an object) and a tip opposite the root at the other end of the hair strand. Each hair strand may also include information about the hair strand, such a root color, tip color, and how to interpolate color along the hair strand between the root and the tip. In one embodiment, hair color can be interpolated linearly from the root color to the tip color.

At step 1804, the processor identifies world space positions of the vertices in the hair strand.

At step 1806, the processor samples the hair strand at N number of locations along the hair strand. The value of N is configurable. In one implementation, the value of N may be on the order of 4-64 samples. In one embodiments, the N samples are evenly spaced along the hair strand. Another embodiment introduces some dithering to improve aliasing also. If you use the same offsets and spacing for the anchor points it may cause aliasing, for example, because each of the sample locations sampled the shadows at the same interval. But if you have dithering and random offsets, in some embodiments, it may adds pleasant noise instead. These offsets could be low discrepancy numbers, such as "blue noise dithering."

At step 1808, the processor culls non-visible samples based on non-visible segments. As described above in FIG. 13, conservative depth testing coarsely culls hair segments that are completely occluded by opaque objects. Therefore, at step 1808, any of the N samples along the hair strand that are associated with coarsely culled hair segments based on the conservative depth testing can also be culled. One embodiment re-uses the visibility information that was output from the front end culling. For example, each segment ID has a 1-bit value that the shading task "prepare" takes into account and only generates a list of shading tasks for visible segments.

At step 1810, the processor calculates lighting and shading for the visible samples. The visible samples are those samples that were not culled at step 1808. Step 1810 takes into account lighting, shadows, and the interpolated color values at the visible sample locations based on color interpolation between the root and tip of the hair strand. Some embodiments also do things like simulating deep scattering within the hair volume at this step to introduce nice translucency effects. Simulating deep scattering may be part of the computing shadows.

At step 1812, the processor stores color values for the visible samples in a shading storage. The shading storage is a buffer that will be later exposed to the rasterizer so it can do color lookups for a given pixel, as described in greater detail below. In one implementation, all assets write into the same shading storage such that the rasterizer has access to the shading of each asset; hence, how the rasterizer can rasterize in one shot rather than having to spin it up (i.e., waste overhead) over and over for each character.

At step 1814, the processor determines whether there are any more hair strands to process for a given character. If yes, the method returns to step 1802, where the next hair strand is selected for processing. If the processor determines that there are no more hair strands to process, the method terminates.

The method of FIG. 18 can be repeated for each character (i.e., asset) that includes hair strands, and the results can be stored in the shading storage with separate offsets per character.

Figure 19:
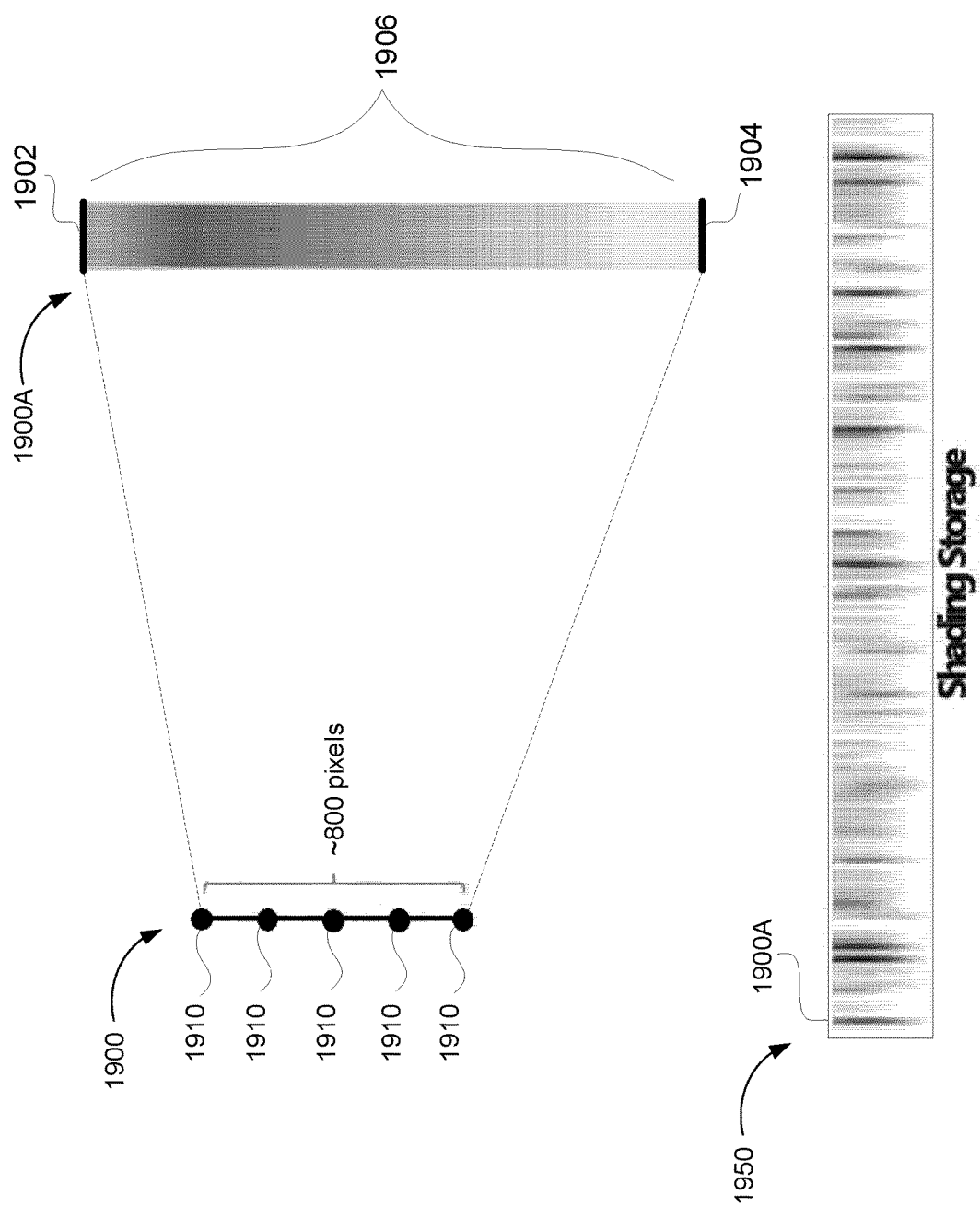
FIG. 19 is a conceptual diagram illustrating strand space shading, according to one embodiment.

FIG. 19 is a conceptual diagram illustrating strand space shading, according to one embodiment. An example hair strand 1900 is shown. In the example shown, the hair strand 1900 has been straightened out into a line for ease of description. In one example, the hair strand 1900 may cover about 800 pixels in screen space. The hair strand 1900 may be sampled along its length at a configurable interval (e.g., every 3 pixels), resulting in samples 1910 (note, that just 5 samples are shown in FIG. 19 for clarity).

The hair strand 1900 can be visualized as a gradient 1900A. The gradient 1900A includes a root color 1902 of the hair strand 1900 and a tip color 1904 of the hair strand 1900. Color along the gradient 1900A can be interpolated 1906, e.g., linearly, between the root color 1902 and the tip color 1904. In one implementation, the artists provide a root color and tip color, but hue for the hair comes from the shadowing and the anisotropic lighting simulation as well as deep scattering simulation. It should be noted that these simulations may be evaluated at the anchor points.

As described, non-visible samples (i.e., samples corresponding to non-visible hair segments) are culled and shading information is calculated for the visible samples. The results of this sparse shading, i.e., color information at the sample locations, are saved in a shading storage 1950. In the example shown, the entire length of the hair strand 1900 is visible, so each sparsely shaded sample for the hair strand is saved in the shading storage 1950. FIG. 18 shows a serial process, but again, the method shown in FIG. 18 can be done in parallel with one thread per hair segment and then all the characters are processed in parallel.

Rasterization

After the front-end rasterization (i.e., step 904) is completed and the strand space shading information has been pre-stored in the shading storage (i.e., step 906), the tiles with potentially visible hair can be rasterized (i.e., step 908). Each tile of the render target can be processed independently, e.g., by separate GPU threads. The result of this hair rasterization step is a hair overlay that can be simply applied on top of the rest of the rendered image, which can be rendered based on the underlying polygon geometry. In one embodiment, there is a single tile queue and the multiple tile processors grab work from the tile queue cooperatively. Only active tiles are in the tile queue so we never touch inactive tiles. An active tile may be a tile with at least one active cluster. An active cluster is a cluster with at least one visible segment. In another implementation, there could be multiple tile queues where each processor is anchored to pull work from their respective tile queue. Hardware might implement it as such. Then you could have the coarse rasterizer submitting tiles to different queues as a load balancing mechanism.

Figure 20:
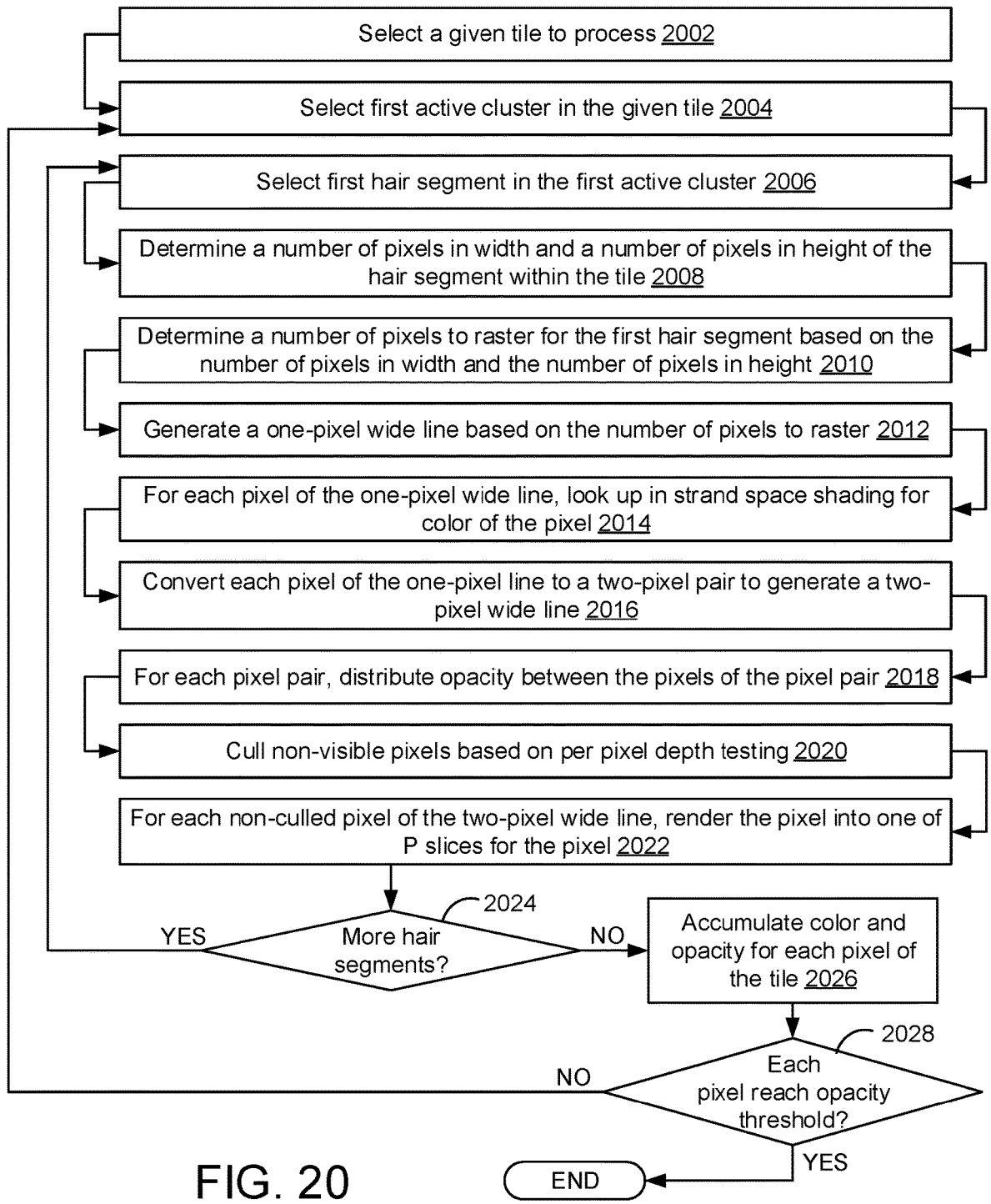
FIG. 20 is a flow diagram for rasterizing tiles with visible hair, according to one embodiment.

FIG. 20 is a flow diagram for rasterizing tiles with potentially visible hair, according to one embodiment. In various implementations, the method can be performed by the processor 110, the graphics processor 116, or a combination of the processor 110 and the graphics processor 116. The flow diagram in FIG. 20, in one implementation, represents more detail about step 908 in FIG. 9.

As shown, the method begins at step 1802, where the processor selects a first tile to process. As described above, the hair segments within the tile have been classified by depth into clusters (for example, see step 1008 in FIG. 10).

At step 2004, the processor selects a first active cluster in the given tile to process. Since hair is layered, hair should be rendered front to back (from the perspective of the camera) in order to achieve proper results. As described above in FIGS. 15-17, each tile is broken down into clusters by depth. The active clusters are those clusters within the tile that have overlapping hair segments. At step 2004, the first active cluster is selected as the next cluster, in order from the perspective of the camera, that includes visible hair segments. Selecting the next active cluster (in order) provides for proper rendering results by rending front-to-back, given that hair is layered, as described above. Active clusters may be tracked using a bit mask (e.g., "1100101001") and we can just run a "find first set" hardware instructions to get the next active cluster index. Each time we retire a cluster, the bit for that cluster is turned off from 1 to 0.

At step 2006, the processor selects a first hair segment in the first active cluster. In one embodiment, each hair segment in the first active cluster is processed. The order of processing the hair segments within the first active cluster is not critical, as the hair segments within the first active cluster can be processed in any order. In one embodiment, each hair segment is processed by launching a separate GPU thread. In one implementation, a tile processor contains 256 threads, so we process 256 hair segments in parallel. There may be several processors each working on their own tile. As such, the processing occurs in parallel.

Optionally, in some embodiments, at step 2006, the processor may further tessellate the selected first hair segment into sub-segments. In one embodiment, to perform tessellation, for each visible hair segment of the hair strand (i.e., after coarse culling using conservative depth testing), the visible hair segments can be broken down into M number of sub-segments. In one implementation, M=4 and each hair segment is broken down (i.e., tessellated) into 4 sub-segments. The rasterization in FIG. 20 at step 2006 onwards can therefore be performed on sub-segments after tessellation, in some embodiments. The remaining steps in FIG. 20 referring to "hair segments" can therefore refer to the original hair segments (pre-tessellation) or sub-segments (after tessellation), depending on the implementation. Curvature information of a segment is known from the two vertices of the hair segment and tangents that make up the hair segment. This data allows us to "sample" the hair segment and subdivide it into finer sub-segments. The tangents are what gives the curve of the newly tessellated sub-segments, as they allows us to say what the "derivative" at a particular point should be and that enforces the new points to follow a curve. Cubic splines can be used in one implementation. Because tessellation is done at rasterization time on-chip in registers, we pay no additional memory overhead for the details. As such, tessellations can be done adaptively in some implementations. No need to tessellate when far away from the camera, for example. Also, in some implementation, if the hair segments are fairly straight (e.g., within a threshold) it does not need to be tessellated.

Figure 21A:
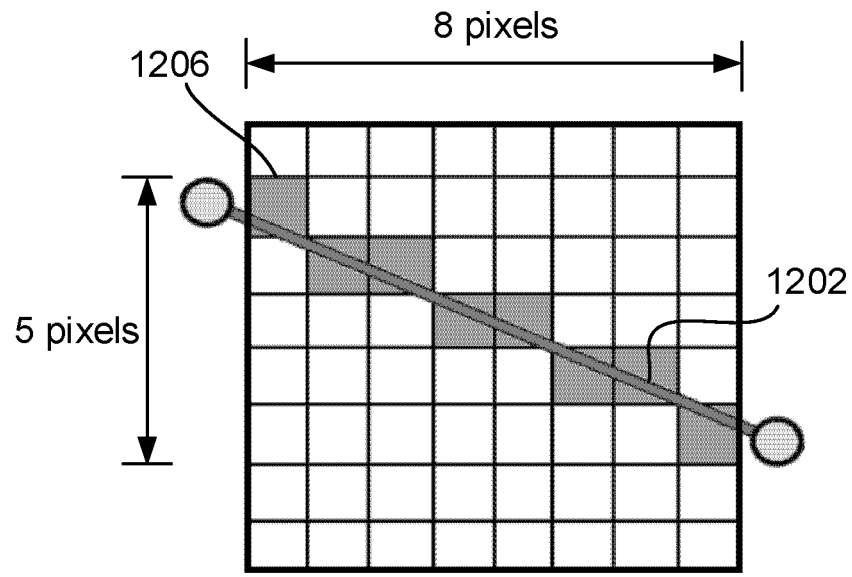
FIG. 21A is an example of a shallow hair segment with respect to the orientation of a tile.
Figure 21B:
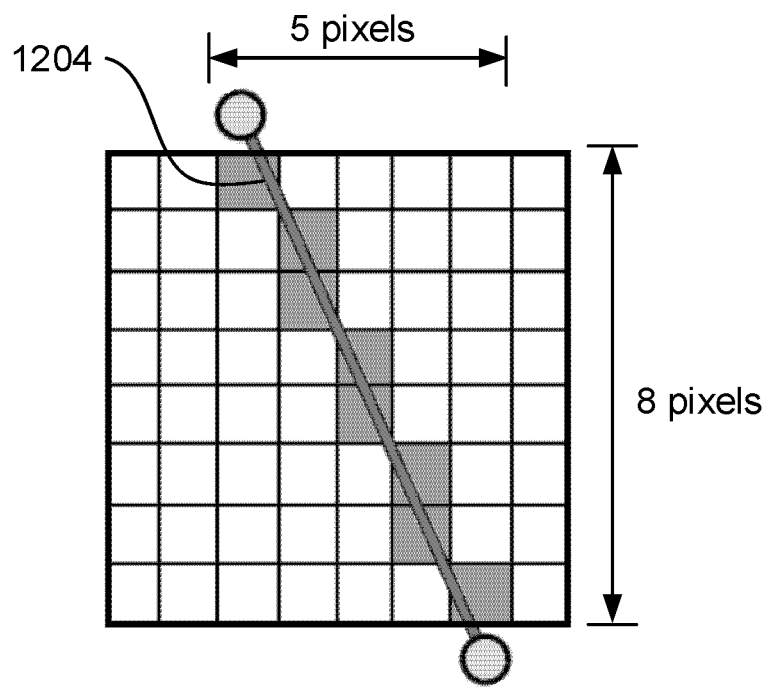
FIG. 21B is an example of a steep hair segment with respect to the orientation of a tile.

At step 2008, the processor determines a number of pixels in width and a number of pixels in height of the hair segment within the tile. In some embodiments, the processor determines the number of pixels to raster for a given hair segment based on its orientation. FIG. 21A is an example of a shallow hair segment with respect to the orientation of a tile, and FIG. 21B is an example of a steep hair segment with respect to the orientation of a tile. A shallow hair segment, as used herein, is a hair segment that spans more pixels in the x-direction than it does in the y-direction. A steep hair segment, as used herein, is a hair segment that spans more pixels in the y-direction than it does in the x-direction.

In the examples in FIGS. 21A-21B, the pixel tiles are 8×8 pixel tiles. Hair segment 1202 in FIG. 21A has vertices that fall outside the bounds of the tile. Hair segment 1202 is considered a shallow hair segment, as it spans more pixels in the x-direction (i.e., 8 pixels) than it does in the y-direction (i.e., 5 pixels). Hair segment 1204 in FIG. 21B has vertices that also fall outside the bounds of the tile. Hair segment 1204 is considered a steep hair segment, as it spans more pixels in the y-direction (i.e., 8 pixels) than it does in the x-direction (i.e., 5 pixels).

At step 2010, the processor determines a number of pixels to raster for the first hair segment based on the number of pixels in width and the number of pixels in height. In one embodiment, the number of pixels to raster for the first hair segment is determined as the maximum of the number of pixels in width and the number of pixels in height within the tile of the first hair segment. In the examples in FIG. 21A and FIG. 21B, the number of pixels to raster for both hair segments 1202, 1204 would be determined as eight (8).

At step 2012, the processor generates a one-pixel wide line based on the number of pixels to raster for the first hair segment. In some implementations, hair geometry is thinner than the width of a single pixel. To generate the one-pixel wide line, the processor fills one pixel in the major direction (i.e., the direction with greater tile coverage), stepping down diagonally along the hair segment to match the number of pixels of coverage in the minor direction (i.e., the direction with the smaller tile coverage). In FIG. 21A, shaded pixels 1206 are the pixels that are selected for the one-pixel wide line. As shown in FIG. 21A, eight (8) pixels are selected to be rasterized.

At step 2014, for each pixel of the one-pixel wide line, the processor looks up in strand space shading for color of the pixel. As described in FIGS. 18-19, stand space shading provides a shading storage buffer that includes color information for sparsely sampled locations along a hair strand. For a given pixel, at step 2014, the processor looks into the strand space shading buffer for the hair strand associated with first hair segment being processed, and identified the location of the pixel as being between two sparsely sampled shading locations. Each of the two neighboring sparsely sampled shading locations is associated with a color value in the shading storage. The processor then interpolates between these two color values to determine a color for the given pixel of the one-pixel line. This process of looking up into the shading storage and interpolating is repeated for each pixel of the one-pixel line to determine a color for each pixel of the one-pixel line. The result of completing step 2014 is that each pixel of the one-pixel line is associated with its own color value. In some embodiments, the depth in the z-direction of each pixel of the one-pixel wide line is also stored based on the depth value of the hair segment at the respective pixels. The depth may be useful for doing things like camera Depth of Field blurring or motion blur, in some optional implementation. If those effects are not needed, storing depth can be omitted.

However, as shown, the one-pixel wide line may be a jagged line, such that if it were to be rasterized directly, the results would also be jagged. Thus, embodiments of the disclosure provide analytical anti-aliasing to smooth out the rasterization.

At step 2016, the processor converts each pixel of the one-pixel line to a two-pixel pair to generate a two-pixel wide line. In one embodiment, for each pixel of the one-pixel line, to determine which pixel should be selected as the pixel for the two-pixel pair, the processor determines which two pixel centers (e.g., in the vertical direction) the hair segment is between and selects the other pixel as the pixel for the two-pixel pair.

Figure 22:
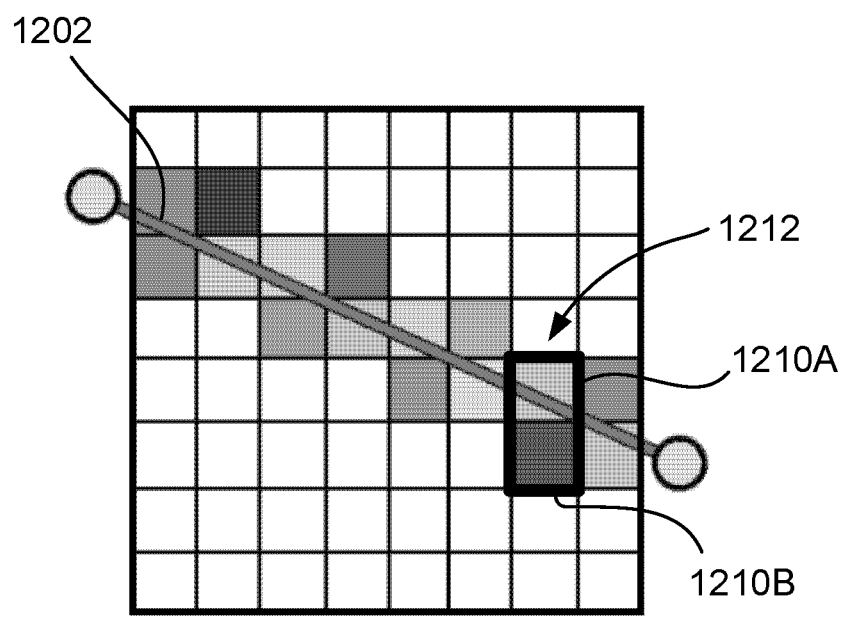
FIG. 22 is an example illustrating a two-pixel wide line, according to one embodiment.

FIG. 22 is an example illustrating a two-pixel wide line, according to one embodiment. FIG. 22 relates to the hair segment 1202 shown in FIG. 21A. In FIG. 22, each pixel of the one-pixel line (i.e., FIG. 21A) has been expanded to a two-pixel pair, thus forming a two-pixel wide line.

For pixel 1210A, pixel 1210B was selected as the other pixel for the pixel pair 1212, since the hair segment passes between the pixel centers of pixel 1210A and pixel 1210B (in the vertical direction).

In one embodiment, for each pixel of the one-pixel line, the color value of the pixel is copied to the other pixel of the two-pixel pair. For example, as shown in FIG. 22, pixel 1210A and 1210B form a pixel pair 1212. The color value for pixel 1210A was determined by look up in to the stand space shading storage and interpolation. The resultant color value is then copied to pixel 1210B. In some embodiments, the depth value of a given pixel of the one-pixel wide line is also copied to the second pixel of the two-pixel pair.

To perform analytical anti-aliasing, in some embodiments, the processor can assign different opacity to the pixels of the pixel pair, even though the color of the two pixels of the pixel pair is the same.

At step 2016, for each pixel pair, the processor distributes opacity between the pixels of the pixel pair. The opacity is distributed between the two pixels of the pixel pair based on where the hair segment cuts between the two pixels of the pixel pair. In one embodiment, the opacity is distributed based on coverage of the hair segment among the two pixels of the pixel pair. For example, if the coverage of the hair segment among the two pixels in the pixel pair is distributed as 60% and 40%, then the opacity will be distributed as 60% and 40%, respectively. If the hair segment is entirely covered within one pixel of the pixel pair, then the opacity can be distributed as 100% (covered pixel) and 0% (uncovered pixel). In another embodiment, opacity can be distributed based on how closely the hair segment passes between the pixel centers of the two pixels of the pixel pair. The result of performing this so-called analytical anti-aliasing is a two-pixel wide line of pixels to be rasterized formed of two-pixel pairs, where the color of each pixel is the same for both pixels of each pixel pair, but the opacity is distributed among the pixels in each pixel pair. In one implementation, there is one thread mapping to one pixel pair. So with the previous number of 256 threads, one implementation can process 256 pixel pairs in parallel per processor (and there are several processors in flight). Each thread looks up and interpolates the color value independently. The copying of color to the second pixel of the pixel pair is natural since one thread is responsible for two pixels (i.e., the pixel pair). Synchronization primitives can be used when we inject the color values into the slices, as multiple lines can "overlap" each other when we process these pixel pairs in parallel, since our group of 256 threads can map over several line segments and they may cross each other. Only pixels with conflicts are resolved while we inject color information into a slice data structure.

At step 2020, the processor culls non-visible pixels based on per pixel depth testing. Each of the pixels of the two-pixel wide line is tested against the geometry of the render target to cull any pixels that are occluded by opaque objects. This culling removes any hair pixels of the two-pixel wide line that are located at the edges and "behind" opaque objects, from the perspective of the camera. Performing this per-pixel culling is what allows some embodiments to simply overlay the final hair color (e.g., hair overlay) over the opaque, scene since we have removed all the pixels from the hair overlay that would block the hair already.

At step 2022, for each non-culled pixel of the two-pixel wide line, the processor renders the pixel into one of P slices for the pixel in the current cluster. In one embodiment, each cluster can be further subdivided by depth into P slices for each pixel. For example, the slices can be represented by a 6-bit number, resulting in P=64 slices per pixel per cluster. In one implementation, the P slices are evenly distributed by depth along the depth of the cluster. At step 2022, for each pixel that was not culled via per-pixel depth testing, the pixel is assigned to one of the P-slices. In one implementation, the color value for the pixel is saved into a buffer that includes a space for each slice. If a given pixel is assigned to a slice that has no other pixels assigned to it yet (i.e., from other hair segments in the cluster that overlap that pixel), then the color value and opacity value for the pixel is added to the buffer at the location corresponding to that slice. If a given pixel is assigned to a slice that has another pixel already assigned to it, then a linked list can be formed containing the color values and opacity values for the pixels assigned to that slice. Once all pixels and all hair segments for the cluster have been processed, the color values and the opacity values in the linked lists for the slices that have multiple pixels that are assigned to said slices can be averaged together to give a single color value and a single opacity value for that slice for that pixel.

In another implementation, instead of averaging the color values over the "conflicts" where linked lists were performed, the list chain could be sorted in front-to-back order, which may give better results. But doing so may be overkill because the cluster "distribution" is non-linear and there are 64 slices for each cluster, which gives us plenty of resolution. As such, clustering along the depth provides "low effort" sorting. Also, since we process clusters one at a time, once we are done with a cluster, all the intermediate memory used for that cluster can be thrown away and we can re-use that memory for the next cluster. This is a huge advantage, as the memory is transient. We completely finish a cluster before moving over to the next cluster, so we do not need to allocate intermediate storage for all the P-slices for the entire render target (e.g., 4K render target), but rather the total number of "processors" that are in-flight in parallel. For example, if you have 12 processors in flight, then you only allocate storage for 12 P-slices for clusters. Even if you render target is 4K and has 32 clusters×480 tiles in the x-direction×270 tiles in Y using 8×8 tiles, this would be 4,147,200 cluster P-slice storage (i.e., 32×480×270=4,147,200). However, the disclosed process of processing clusters in front-to-back and finishing one cluster before moving over to the next cluster allow us to allocate only as much as we can process in parallel.

At step 2024, the processor determines whether there are any more hair segments to process for a given cluster. If yes, the method returns to step 2006, described above, and another hair segment in the cluster is processed. If no, the method proceeds to step 2026. In one implementation, we have 256 threads per processor, so we can process 256 hair segments in parallel. Once we determine 256 different pixel values (based on the orientation of the line) we can start mapping the 256 threads over the pixels in parallel until we have consumed all the pixels belonging to the current set of 256 segments. Then we grab 256 more segments (or less if we are at the end of the buffer for the current cluster).

At step 2026, the processor accumulates color and opacity for each pixel of the tile. Color for a given pixel can be accumulated by averaging the color values of the P slices for that pixel by averaging the color values stored in the P slices for that pixel.

Accumulating opacity, however, is done in an ordered manner, according to the P slices, as hair should be rendered front-to-back, as discussed above. FIG. 23 is a conceptual diagram illustrating how to accumulate opacity, according to one embodiment. As described above, when rendering hair, one embodiment renders front-to-back from a camera location 2300 into the scene to take into account layering of the hair. In the example in FIG. 23, there are four (4) hair segments that overlap a given pixel for which opacity is being accumulated, i.e., hair segments 2302, 2304, 2306, 2308. These hair segments have been rasterized into four separate slices within the cluster and correspond to the same pixel location. For each hair segment, a color value and an opacity value has been assigned to the different corresponding slices based on depth. In one example, for ease of discussion, the pixels corresponding to each of the hair segments 2302, 2304, 2306, 2308 has been assigned a 50% opacity value.

To accumulate opacity, we start with 100% visibility (i.e., 0% opacity) for the pixel and march into the scene from the camera location 2300. Each slice is checked for any pixels corresponding to hair segments at that slice for that pixel. When a slice is encountered that includes opacity information (and color information), opacity is accumulated based on the opacity assigned to that slice. In the example in FIG. 23, the slice (pixel) corresponding to hair segment 2302 is first encountered, which has 50% opacity. Thus, the overall opacity is accumulated at 50% (i.e., 50% of 100% visibility=50% opacity). Then, the next slice that is encountered is associated with the pixel corresponding to hair segment 2304, which also has 50% opacity. Of the 50% visibility that remains, 50% more opacity is accumulated, resulting in 25% visibility (i.e., 75% opacity). Then, the next slice that is encountered is associated with the pixel corresponding to hair segment 2306, which also has 50% opacity. Of the 25% visibility that remains, 50% more opacity is accumulated, resulting in 12.5% visibility (i.e., 87.5% opacity). Continuing on, the next (last) slice that is encountered is associated with the pixel corresponding to hair segment 2308, which also has 50% opacity. Of the 12.5% visibility that remains, 50% more opacity is accumulated, resulting in 6.25% visibility (i.e., 93.75% opacity). Opacity can be accumulated in this manner for each pixel of the tile.

The result of completing step 2024 is a color value and an opacity value for each pixel of the tile. At step 2028, the processor determines whether the opacity of each pixel with potentially visible hair (i.e., hair that was not culled using conservative depth culling) has reached an opacity threshold. If yes, the method terminates. If not, the method return to step 2004, where the next active cluster for the given tile is selected and the opacity is further accumulated with the next active cluster. As such, if we early terminate a cluster since the opacity of each pixel with potentially visible hair has reached an opacity threshold, then we drop all other clusters belonging to that tile, and we look in the tile queue for additional work on a different tile. If no tile remains in the queue, then the rasterizer completes processing.

In one implementation, the per-pixel opacity threshold is 97.5%. This opacity threshold is configurable. Using the example opacity threshold of 97.5%, the opacity in FIG. 23 from processing the pixel shown for the first cluster (i.e., 93.75% opacity) does not satisfy the opacity threshold, thus the next cluster is processed according to the method of FIG. 20, and the opacity is further accumulated with the next active cluster.

If all active clusters have been processed and the opacity threshold has still not been reached for every pixel with potentially visible hair in the given tile, the method terminates. In some implementations, this could occur if individual "wisps" of hair are extending form the character, such that there are not enough hair strands covering a given pixel to reach the opacity threshold. As such, each cluster will be evaluated, and the pixel will raster with an opacity that is below the opacity threshold. As described above, early terminating a cluster since the opacity of each pixel with potentially visible hair has reached an opacity threshold gives a performance improvement.

The method shown in FIG. 20 can be repeated for each tile with potentially visible hair (i.e., hair that was not culled using conservative depth culling). The result of processing the method of FIG. 20 for each tile with potentially visible hair is a rasterized hair overlay that can be applied on top of a rendered image (without hair) to render the overall image. Each pixel of the rasterized hair overlay will include a color value and an opacity value for the hair at that pixel.

Automatic LOD (Level of Detail)

In some embodiments, level of detail (LOD) can be reduced to maintain performance when rendering hair strands that end up contributing to a small portion of the screen space. In one implementation, when it is time to render hair for an asset (e.g., character), the processor determines an estimated "screen coverage" of the hair of the asset. For example, the determination can be based on a sphere of a head of the asset projected to the screen. This gives a heuristic of the percentage of the screen covered by the hair of the asset.

Based on this estimated percentage of screen coverage, some of hair strands that are modeled for the asset are eliminated. Eliminating hair strands is done by randomly eliminating some of the hair strands for the asset based on the percent of screen coverage (i.e., smaller percentage of screen coverage results in higher percentage of hair strands being eliminated). As such, a lower number of hair strands are submitted to the rasterizer. Randomly eliminating triangles in a polygonal mesh geometry would typically not be possible without re-stitching the geometry to account for the eliminated triangle. But with hair, some embodiments can randomly eliminate hair strands to do LOD for the hair of the asset. As such, the number of hair strands to submit to the rasterizer is driven by a heuristic that is dependent on an estimation of how much screen area the head of the asset covers. As an example, assets further from the camera cover less area on the screen, thus more of the hair strands for those assets can be eliminated at random for rendering.

CONCLUSION

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for hair rasterization, the method comprising:
   receiving, by one or more processors, hair data for an asset, wherein the hair data includes one or more hair strands associated with the asset, and each hair strand includes one or more hair segments;
   determining, by the one or more processors, a first set of hair segments that is not fully occluded by one or more opaque objects relative to a location of a camera configured to capture an image of a scene that includes the asset;
   classifying, by the one or more processors, each hair segment in the first set of hair segments into one or more buckets corresponding to one or more tiles of pixels that the hair segment overlaps in screen space;
   for each bucket corresponding to a given tile of pixels, further classifying, by the one or more processors, each hair segment in the bucket for the given tile into clusters arranged by depth from the location of the camera;
   for each tile of pixels, rasterizing, by the one or more processors, the hair segments included in a first cluster for the tile, the first cluster for the tile being the cluster that is nearest to the location of the camera that includes at least one hair segment, and accumulating, by the one or more processors, color and opacity for each pixel of the tile based on rasterizing the hair segments included in the first cluster; and
   combining, by the one or more processors, the tiles of pixels that include rasterized hair segments to generate a hair overlay, wherein the hair overlay is configured to be applied on top of a rendered image of objects in the scene to add hair to the rendered image.

2. The method according to claim 1, wherein determining the first set of hair segments that is not fully occluded by one or more opaque objects relative to the location of the camera comprises:
- for each pixel in screen space, determining a distance from the location of the camera to a nearest opaque surface covered by the pixel as a per-pixel distance for the pixel;
- for each tile of pixels, aggregating the per-pixel distances for the pixels associated with the tile to determine a conservative depth value for the tile, wherein the conservative depth value is a value equal to the maximum per-pixel distance among the pixels of the tile; and
- determining that a hair segment is included in the first set of hair segments that is not fully occluded by one or more opaque objects based on determining that at least a portion of the hair segment is closer to the location of camera than the conservative depth value for the tile corresponding to the portion of the hair segment.

3. The method according to claim 1, wherein, for a first tile of pixels, a dimension of the clusters for the first tile pixels in a depth direction relative to the location of the camera increases non-linearly with increasing distance from the location of the camera.

4. The method according to claim 1, wherein for a first cluster of a first tile, rasterizing a hair segment associated with the first cluster comprises:
- determining a number of pixels to raster for the hair segment;
- generating a one-pixel wide line for the hair segment based on the determined number of pixels to raster for the hair segment;
- for each pixel of the one-pixel wide line, perform a look up in a strand space shading storage to determine a color value for the pixel;
- convert each pixel of the one-pixel wide line to a two-pixel pair to generate a two-pixel wide line for the hair segment, wherein, for a given pixel of the one-pixel line, the determined color value for the given pixel is copied to the other pixel of the two-pixel pair for the given pixel;
- for each pixel pair that makes up the two-pixel wide line, distribute opacity between the two pixels of the two-pixel pair; and
- culling any occluded pixels by performing per pixel depth testing against opaque objects in the scene.

5. The method according to claim 4, wherein a first pixel pair includes a first pixel and a second pixel, and distributing opacity between the first pixel and the second pixel in the first pixel pair is based on determining relative coverage among the first pixel and the second pixel of a first hair segment that overlaps the first pixel and the second pixel.

6. The method according to claim 4, further comprising generating color values stored in the strand space shading storage, which comprises:
- receiving hair strand data for a first hair strand, wherein the hair strand data includes a root color for a root of the first hair strand, a tip color for a tip of the first hair strand, and information about how to interpolate color along the first hair strand from the root to the tip;
- sampling the hair strand at N number of locations along the first hair strand;
- culling sample locations corresponding to hair segments of the first hair strand that are not included in the first set of hair segments that is not fully occluded by one or more opaque objects to generate a set of visible sample locations for the first hair strand;
- performing shading at the visible sample locations; and
- storing the results of performing shading in the strand space shading storage.

7. The method according to claim 1, wherein, for a first pixel of a first tile, accumulating color for the first pixel comprises:
- averaging color values associated with the pixels corresponding to rasterized hair segments included in the first cluster for the first tile that overlap a location the first pixel in screen space.

8. The method according to claim 1, wherein, for a first pixel of a first tile, accumulating opacity for the first pixel comprises:
- receiving a buffer of opacity values corresponding to rasterized hair segments included in the first cluster for the first tile that overlap a location the first pixel in screen space, wherein the buffer of opacity values is sorted in order based on nearest distance to the location of the camera; and
- accumulating opacity for the first pixel based on the order of the opacity values in the buffer of opacity values.

9. A non-transitory computer-readable storage medium storing instructions that, when executed by one or more processors, causes a computing device to perform hair rasterization, by performing the steps of:
- receiving hair data for an asset, wherein the hair data includes one or more hair strands associated with the asset, and each hair strand includes one or more hair segments;
- determining a first set of hair segments that is not fully occluded by one or more opaque objects relative to a location of a camera configured to capture an image of a scene that includes the asset;
- classifying each hair segment in the first set of hair segments into one or more buckets corresponding to one or more tiles of pixels that the hair segment overlaps in screen space;
- for each bucket corresponding to a given tile of pixels, further classifying each hair segment in the bucket for the given tile into clusters arranged by depth from the location of the camera;
- for each tile of pixels, rasterizing the hair segments included in a first cluster for the tile, the first cluster for the tile being the cluster that is nearest to the location of the camera that includes at least one hair segment, and accumulating color and opacity for each pixel of the tile based on rasterizing the hair segments included in the first cluster; and
- combining the tiles of pixels that include rasterized hair segments to generate a hair overlay, wherein the hair overlay is configured to be applied on top of a rendered image of objects in the scene to add hair to the rendered image.

10. The computer-readable storage medium according to claim 9, wherein determining the first set of hair segments that is not fully occluded by one or more opaque objects relative to the location of the camera comprises:
- for each pixel in screen space, determining a distance from the location of the camera to a nearest opaque surface covered by the pixel as a per-pixel distance for the pixel;
- for each tile of pixels, aggregating the per-pixel distances for the pixels associated with the tile to determine a conservative depth value for the tile, wherein the conservative depth value is a value equal to the maximum per-pixel distance among the pixels of the tile; and determining that a hair segment is included in the first set of hair segments that is not fully occluded by one or more opaque objects based on determining that at least a portion of the hair segment is closer to the location of camera than the conservative depth value for the tile corresponding to the portion of the hair segment.

11. The computer-readable storage medium according to claim 9, wherein, for a first tile of pixels, a dimension of the clusters for the first tile pixels in a depth direction relative to the location of the camera increases non-linearly with increasing distance from the location of the camera.

12. The computer-readable storage medium according to claim 9, wherein for a first cluster of a first tile, rasterizing a hair segment associated with the first cluster comprises:
   determining a number of pixels to raster for the hair segment;
   generating a one-pixel wide line for the hair segment based on the determined number of pixels to raster for the hair segment;
   for each pixel of the one-pixel wide line, perform a look up in a strand space shading storage to determine a color value for the pixel;
   convert each pixel of the one-pixel wide line to a two-pixel pair to generate a two-pixel wide line for the hair segment, wherein, for a given pixel of the one-pixel line, the determined color value for the given pixel is copied to the other pixel of the two-pixel pair for the given pixel;
   for each pixel pair that makes up the two-pixel wide line, distribute opacity between the two pixels of the two-pixel pair; and
   culling any occluded pixels by performing per pixel depth testing against opaque objects in the scene.

13. The computer-readable storage medium according to claim 12, wherein a first pixel pair includes a first pixel and a second pixel, and distributing opacity between the first pixel and the second pixel in the first pixel pair is based on determining relative coverage among the first pixel and the second pixel of a first hair segment that overlaps the first pixel and the second pixel.

14. The computer-readable storage medium according to claim 12, wherein the steps include generating color values stored in the strand space shading storage, which comprises:
   receiving hair strand data for a first hair strand, wherein the hair strand data includes a root color for a root of the first hair strand, a tip color for a tip of the first hair strand, and information about how to interpolate color along the first hair strand from the root to the tip;
   sampling the hair strand at N number of locations along the first hair strand;
   culling sample locations corresponding to hair segments of the first hair strand that are not included in the first set of hair segments that is not fully occluded by one or more opaque objects to generate a set of visible sample locations for the first hair strand;
   performing shading at the visible sample locations; and
   storing the results of performing shading in the strand space shading storage.

15. The computer-readable storage medium according to claim 9, wherein, for a first pixel of a first tile, accumulating color for the first pixel comprises:
   averaging color values associated with the pixels corresponding to rasterized hair segments included in the first cluster for the first tile that overlap a location the first pixel in screen space.

16. The computer-readable storage medium according to claim 9, wherein, for a first pixel of a first tile, accumulating opacity for the first pixel comprises:
   receiving a buffer of opacity values corresponding to rasterized hair segments included in the first cluster for the first tile that overlap a location the first pixel in screen space, wherein the buffer of opacity values is sorted in order based on nearest distance to the location of the camera; and
   accumulating opacity for the first pixel based on the order of the opacity values in the buffer of opacity values.

17. A device for rasterizing hair, the device comprising:
   a memory storing instructions; and
   one or more processors configured to the execute the instructions to cause the device to:
      receive hair data for an asset, wherein the hair data includes one or more hair strands associated with the asset, and each hair strand includes one or more hair segments;
      determine a first set of hair segments that is not fully occluded by one or more opaque objects relative to a location of a camera configured to capture an image of a scene that includes the asset;
      classify each hair segment in the first set of hair segments into one or more buckets corresponding to one or more tiles of pixels that the hair segment overlaps in screen space;
      for each bucket corresponding to a given tile of pixels, further classify each hair segment in the bucket for the given tile into clusters arranged by depth from the location of the camera;
      for each tile of pixels, rasterize the hair segments included in a first cluster for the tile, the first cluster for the tile being the cluster that is nearest to the location of the camera that includes at least one hair segment, and accumulate color and opacity for each pixel of the tile based on rasterizing the hair segments included in the first cluster; and
      combine the tiles of pixels that include rasterized hair segments to generate a hair overlay, wherein the hair overlay is configured to be applied on top of a rendered image of objects in the scene to add hair to the rendered image.

18. The device according to claim 17, wherein for a first cluster of a first tile, rasterizing a hair segment associated with the first cluster comprises:
   determining a number of pixels to raster for the hair segment;
   generating a one-pixel wide line for the hair segment based on the determined number of pixels to raster for the hair segment;
   for each pixel of the one-pixel wide line, perform a look up in a strand space shading storage to determine a color value for the pixel;
   convert each pixel of the one-pixel wide line to a two-pixel pair to generate a two-pixel wide line for the hair segment, wherein, for a given pixel of the one-pixel line, the determined color value for the given pixel is copied to the other pixel of the two-pixel pair for the given pixel;
   for each pixel pair that makes up the two-pixel wide line, distribute opacity between the two pixels of the two-pixel pair; and
   culling any occluded pixels by performing per pixel depth testing against opaque objects in the scene.

19. The device according to claim 18, wherein a first pixel pair includes a first pixel and a second pixel, and distributing opacity between the first pixel and the second pixel in the first pixel pair is based on determining relative coverage among the first pixel and the second pixel of a first hair segment that overlaps the first pixel and the second pixel.

20. The device according to claim 18, wherein executing the instructions further causes the device to generate color values stored in the strand space shading storage, wherein generate the color values comprises:

receiving hair strand data for a first hair strand, wherein the hair strand data includes a root color for a root of the first hair strand, a tip color for a tip of the first hair strand, and information about how to interpolate color along the first hair strand from the root to the tip;

sampling the hair strand at N number of locations along the first hair strand;

culling sample locations corresponding to hair segments of the first hair strand that are not included in the first set of hair segments that is not fully occluded by one or more opaque objects to generate a set of visible sample locations for the first hair strand;

performing shading at the visible sample locations; and storing the results of performing shading in the strand space shading storage.

\* \* \* \* \*